United States Patent [19]

Yamada et al.

[11] 4,182,457

[45] Jan. 8, 1980

[54] MULTILAYER CONTAINER

[75] Inventors: Muneki Yamada, Ebina; Sadao Hirata, Yokohama; Jinichi Yazaki, Tokyo; Yoshitsugu Maruhashi, Yokohama; Kozaburo Sakano, Tokyo; Akira Kishimoto; Shunsaku Hirata, both of Yokohama; Toru Suzuki, Yokosuka; Fumio Kano, Kamakura, all of Japan

[73] Assignee: Toyo Seikan Kaisha Limited, Tokyo, Japan

[21] Appl. No.: 821,484

[22] Filed: Aug. 3, 1977

[30] Foreign Application Priority Data

Aug. 10, 1976 [JP] Japan .................................. 51-94533
Jul. 18, 1977 [JP] Japan .................................. 52-85114

[51] Int. Cl.² ...................... B32B 15/08; B32B 27/08
[52] U.S. Cl. ..................................... 215/1 C; 220/453; 229/1.5 B; 426/127; 428/35

[58] Field of Search ................. 428/35, 340, 474, 910; 215/1 C; 156/243, 244.11, 244.14, 244.22; 229/1.5; 106/524.1, 524.2, 524.3, 524.4, 524.5, 524.6, 524.7, 524.8; 220/453; 426/106, 126, 127, 129, 415

[56] References Cited

U.S. PATENT DOCUMENTS

| | | | |
|---|---|---|---|
| Re. 29,340 | 8/1977 | Matsunami et al. | 428/474 |
| 3,630,826 | 12/1971 | Rose et al. | 426/127 |
| 3,908,070 | 9/1975 | Marzolf | 428/474 |
| 3,949,114 | 4/1976 | Viola et al. | 428/474 |
| 4,058,647 | 11/1977 | Inoue et al. | 426/127 |

*Primary Examiner*—Caleb Weston
*Attorney, Agent, or Firm*—Diller, Ramik & Wight

[57] ABSTRACT

A transparent multi-layer container comprising a co-extrudate of an oxygen-barrier resin layer and an orienting resin layer which is monoaxially or biaxially oriented is disclosed. An adhesive resin layer is preferably interposed between the oxygen-barrier layer and the orienting resin layer, and this co-extrudate is drawn and molded at a specific temperature determined relatively to the melting points and softening points of the respective resins. This container is excellent in the combination of transparency, rigidity, mechanical strength, gas-barrier property and interlaminar peel strength.

9 Claims, No Drawings

MULTILAYER CONTAINER

BACKGROUND OF THE INVENTION

(1) Field of the Invention

This invention relates to a multi-layer plastic drawn and molded container excellent in transparency, rigidity, mechanical strength, water resistance and gas barrier property to oxygen and the like and having a practically satisfactory interlaminar peel strength under falling, shaking or impact, and to a process for the preparation of this excellent container.

(2) Description of the Prior Arts

It is well known that when a thermoplastic resin is drawn at a relatively low temperature, namely at a temperature lower than the melting point or softening point of the resin or a temperature just above the melting point or softening point of the resin, as a result of orientation of the polymer chain or crystal, such properties as rigidity, mechanical strength, gas barrier property and transparency can be improved. These improvements are practically utilized in biaxially drawn films, filaments, drawn tapes, biaxially drawn blow bottles and draw-molded cups.

In the field of narrow- and broad-mounted hollow plastic containers, for example, a biaxially drawn blow bottle of the vinylidene chloride resin type molded according to the method disclosed in Japanese Pat. Publication No. 8583/63 has heretofore been broadly used as a ketchup bottle because it has an excellent gas barrier property. However, because of generation of poisonous gases on burning or migration of the monomer or additive into the content, bottles of this type are hardly used at the present. Biaxially drawn blow bottles of polypropylene formed according to the principle, method and apparatus disclosed in Japanese Pat. Publication No. 16245/63, Japanese Patent Application Laid-Open Specification No. 3492/71, etc., have excellent transparency, rigidity and mechanical strength, and they are broadly used as bottles for shampoo or the like instead of polyvinyl chloride bottles in U.S.A. and as bottles for medicines, for example, Ringer's solution, instead of glass bottles in Japan. Further, broad-mouthed polypropylene cups prepared by solid-phase pressure forming at a relatively low temperature according to the method disclosed in Kunststoffe Bd. 65, 1975, H. 10, page 666 have now been attracting attentions as substitutes for polyvinyl chloride cups. Further, biaxially drawn blow bottles of polyethylene terephthalate disclosed in the specification of U.S. Pat. No. 3,733,309 have been test-marketed as bottles for carbonated drinks and now attract attentions in the art.

In case of the above-mentioned biaxially drawn blow bottles of the vinylidene chloride resin type, when a contained liquid, semi-liquid or pasty food has contact with the inner wall of the bottom, a problem of migration of the monomer or the like rises, and they cannot be regarded as practical semi-rigid containers. Biaxially drawn blow bottles of polypropylene and polypropylene cups prepared by solid phase pressure forming are inferior in the gas barrier property, and they cannot substantially be applied to foods of which the preservability is sensitive to oxygen permeating through the container wall. Although biaxially drawn blow bottles of polyethylene terephthalate have a relatively high gas barrier property and are very excellent in rigidity and transparency, when they are allowed to stand in an atmosphere maintained at 60° to 70° C. for 3 to 5 minutes, they show such thermal shrinkage as an empty volume shrinkage of 1 to 3%, a total height shrinkage of 0.4 to 0.8% and a barrel diameter shrinkage of 0.7 to 1.2%. Further, when they are allowed to stand in an atmosphere maintained at 80° C. for 1 minute, they are deformed to such an extent that they cannot be practically used. Accordingly, these bottles cannot be used when hot filling of contents is conducted or for storage of foods requiring heat sterilization, for example, sauces.

For the foregoing reasons, as in case of melt-molded containers, multi-layer structures in which defects of respective resins are compensated and which can meet practical demands are required in case of not only biaxially drawn blow molded containers prepared by forming a thermoplastic resin into a bottomed or bottomless parison and conducting the step of elongating the parison in the axial direction thereof at a relatively low temperature, for example, the melting point of the resin and the step of inflating the parison in a direction rectangular to the axial direction simultaneously or in this order (namely in sequence) but also biaxially drawn cups pressure-formed in the solid phase from a sheet at a relatively low temperature.

Drawn multi-layer containers are proposed in, for example, the specification of U.S. Pat. No. 3,733,309 and Japanese Patent Application Laid-Open Specification No. 32164/73, but these known drawn multi-layer containers are still insufficient from the practical viewpoint with respect to the interlaminar strength between every two adjacent layers, selection of consituent resin layers and selection of molding conditions such as the molding temperature and draw ratio. In addition, use of an unsaturated carboxylic acid-grafted thermoplastic resin as an adhesive improving the interlaminar peel strength has been proposed in, for example, Japanese Patent Application Laid-Open Specification No. 67384/76, but in this proposal, no sufficient regard is paid to the relation between the molding conditions such as the molding temperature and draw ratio and the adhesiveness.

BRIEF SUMMARY OF THE INVENTION

We found that in order to obtain biaxially drawn blow-molded bottles or draw-molded containers such as solid phase pressure-formed cups, which have a high barrier property to gases such as oxygen and are excellent in the combination of transparency, rigidity, mechanical strength and other physical properties, it is necessary to select very strictly constituent resin layers and molding conditions such as the molding temperature and draw ratio in view of the practical utility and moldability.

We also found that when a draw-molded container is prepared from a multi-layer structure comprising an oxygen-barrier thermoplastic resin layer and a layer of an orienting thermoplastic resin other than the oxygen-barrier thermoplastic resin preferably with an adhesive resin layer interposed between said two resin layers, in order to attain a high interlaminar peel strength, it is very important to select the respective resins so that a specific relation is established among the melting or softening points of the resins and to perform draw-molding at a temperature in a specific range.

In accordance with the present invention, there is provided a container having a multi-layer structure, which comprises a plurality of thermoplastic resins, wherein at least one layer of the container is composed of an oxygen-barrier thermoplastic resin having an oxygen permeability lower than $5.5 \times 10^{-12}$ cc·cm/c-m$^2$·sec·cmHg as measured at 37° C. and at least one of the remaining layers comprises an orienting thermoplastic resin other than the oxygen-barrier thermoplastic resin, said two resins are selected so that the requirement represented by the following formula:

$$|T_B - T_O| \leq 35° C. \tag{1}$$

wherein $T_B$ stands for the melting or softening point (°C.) of said oxygen-barrier thermoplastic resin and $T_O$ stands for the melting or softening point (°C.) of said orienting thermoplastic resin,
is satisfied, and wherein at least one of two-dimensional orientation coefficients (l and m) of at least one layer composed of said orienting thermoplastic resin in a smallest-thickness portion of the container is at least 0.05.

In accordance with the present invention, there is also provided a container having a multi-layer structure, which comprises at least one layer composed of an oxygen-barrier thermoplastic resin having an oxygen permeability lower than $5.5 \times 10^{-12}$ cc·cm/c-m$^2$·sec·cmHg as measured at 37° C., at least one layer comprising an orienting thermoplastic resin other than the oxygen-barrier thermoplastic resin and at least one layer interposed between said oxygen-barrier thermoplastic resin layer and said orienting thermoplastic resin layer and being composed of a resin having an adhesiveness to both of said resins, wherein said three resins are selected so that the requirements represented by the following formulae:

$$|T_B - T_O| \leq 35° C. \tag{1}$$

and $$90° C. \geq T_O - T_C \geq 2° C. \tag{2}$$

wherein $T_B$ stands for the melting or softening point (°C.) of said oxygen-barrier thermoplastic resin, $T_O$ stands for the melting or softening point (°C.) of the melting or softening point of said orienting thermoplastic resin and $T_C$ stands for the melting or softening point (°C.) of said adhesive resin,
at least one of two-dimensional orientation coefficients (l and m) of at least one layer composed of said orienting thermoplastic resin in a smallest-thickness portion of the container is at least 0.05, and wherein the layer of said adhesive resin is substantially non-oriented.

This invention will now be described in detail.

DETAILED DESCRIPTION OF THE PREFERRED EMBODIMENTS Resin Components

In the container of this invention, in order to attain the foregoing objects, it is important that a gas-barrier resin having an oxygen permeability lower than $5.5 \times 10^{-12}$ cc·cm/cm$^2$·sec·cmHg as measured at 37° C. and an orienting thermoplastic resin other than the gas-barrier resin should be selected and combined as the layer-constituting resin so that the difference ($\Delta t = |T_B - T_O|$) between the melting or softening point ($T_B$) of the gas-barrier resin and the melting or softening point ($T_O$) of the orienting thermoplastic resin is smaller than 35° C., especially smaller than 10° C.

In the instant specification and appended claims, the melting point is defined as the thermodynamic primary transition point at which the crystal phase of a crystalline or semi-crystalline polymer is molten, as described in "Crystallization of Polymers" written by Leo Mandelkern and published by McGrow-Hill Book Company in 1964, and in general, the melting point can easily be determined according to the differential thermal analysis method, the specific heat-temperature curve method, the polarizing microscope method, the X-ray diffractometry method, the infrared absorption spectrum method or the like.

Further, in the instant specification and appended claims, the softening point corresponds to the thermodynamic secondary transition point, i.e., the glass transition point, at which a polymer is substantially softened. This softening point is described in, for example, "Physics of Polymers" compiled by Japanese Association of Physics and published by Asakura Shoten in 1963 and can easily be determined by the specific heat- or specific volume-temperature cruve method, the differential thermal analysis method or the industrial test methods such as methods of ASTM D 648-56, ASTM D 1525-58T and ASTM D 569-48.

In general, melt-extrudable thermoplastic resins having a good gas-barrier property to gases such as oxygen and carbon dioxide gas, for example, ethylene-vinyl alcohol copolymers and nylon resins, contain polar groups such as hydroxyl groups and amide groups on the main or side chains of polymers. The melting or softening points of these resins vary broadly depending on the content of polar groups, the chemical composition and other factors.

As described in the specifications of U.S. Pat. Nos. 3,183,203 and 3,419,654, ethylene-vinyl alcohol copolymers can be obtained by saponifying a copolymer of ethylene or a combination of the majority of ethylene and the minority of other olefin such as propylene with a vinyl ester of a lower fatty acid such as vinyl formate, vinyl acetate, vinyl propionate or the like, especially an ethylene-vinyl acetate copolymer. It has been found that in ethylene-vinyl alcohol copolymer resins, the following relation is substantially established between the melting point (Tm) determined according to the differential thermal analysis method or the like and the mole content (%) of ethylene:

$$Tm = 1.64X + 68 \tag{3}$$

wherein Tm stands for the melting point of an ethylene-vinyl alcohol copolymer having an ethylene content of 0 to 80 mole % and X stands for the vinyl alcohol content (mole %) in the copolymer.

It has also been found that in case of nylons of the ring opening polymerization type the melting point varies depending on the kind of the amino acid monomer, in case of nylons of the polycondensation type the melting point varies depends on the kind of the acid and the amine, in case of nylons of the copolymer type the melting point varies depending on the monomer composition, and that in case of nylon polymer blends the melting point varies depending on the polymer blending ratio. Melting points of these nylon type polymers as determined according to the differential thermal analysis method or the like are as shown in Table 1 given hereinafter.

Table 1
Melting Points of Polyamide Resins

| Resin | Melting Point (Tm), °C. |
|---|---|
| Polyamides of Ring Opening Polymerization Type | |
| ω-Aminocaproic acid polymer (nylon 6) | 223 |
| ω-Aminoheptanoic acid polymer (nylon 7) | 233 |
| ω-Aminocaprylic acid polymer (polymer 8) | 200 |
| ω-Aminopelargonic acid polymer (nylon 9) | 210 |
| ω-Aminodecanoic acid polymer (nylon 10) | 188 |
| ω-Aminoundecanoic acid polymer (nylon 11) | 185 |
| ω-Aminododecanoic acid polymer (nylon 12) | 180 |
| ω-Aminotridecanoic acid polymer (nylon 13) | 180 |
| Polyamides of Polycondensation Type | |
| Polyhexamethylene adipamide (6,6-nylon) | 265 |
| Polyhexamethylene azelamide (6,9-nylon) | 185 |
| Polyhexamethylene sebacamide (6,1-nylon) | 225 |
| Polyhexamethylene dodecamide (6,12-nylon) | 212 |
| Polyhexamethylene tridecamide (6,13-nylon) | 204 |
| Polydecamethylene hexamide (10,6-nylon) | 225 |
| Polydecamethylene sebacamide (10,10-nylon) | 213 |
| Polydecamethylene dodecamide (10,12-nylon) | 195 |
| Polydecamethylene tridecamide (10,13-nylon) | 187 |
| Polydodecamethylene adipamide (12,6-nylon) | 210 |
| Polydodecamethylene sebacamide (12,10-nylon) | 190 |
| Polydodecamethylene dodecamide (12,12-nylon) | 185 |
| Polytridecamethylene sebacamide (13,10-nylon) | 170 |
| Polytridecamethylene tridecamide (13,13-nylon) | 174 |
| Nylons of Copolymer Type | |
| 6,6-Nylon-6,10-Nylon Copolymers | |
| 6,6-nylon content of 0 mole % | 225 |
| 6,6-nylon content of 20 mole % | 202 |
| 6,6-nylon content of 30 mole % | 192 |
| 6,6-nylon content of 40 mole % | 195 |
| 6,6-nylon content of 60 mole % | 210 |
| 6,6-nylon content of 80 mole % | 233 |
| 6,6-nylon content of 100 mole % | 265 |
| 6-Nylon-6,6-Nylon Copolymers | |
| 6,6-nylon content of 0 mole % | 223 |
| 6,6-nylon content of 20 mole % | 163 |
| 6,6-nylon content of 40 mole % | 156 |
| 6,6-nylon content of 60 mole % | 170 |
| 6,6-nylon content of 80 mole % | 220 |
| 6,6-nylon content of 100 mole % | 265 |
| Nylon Polymer Blends | |
| 6-Nylon-6,6-Nylon Blends | |
| 6,6-nylon mixing ratio of 0% | 223 |
| 6,6-nylon mixing ratio of 20 mole % | 215 |
| 6,6-nylon mixing ratio of 40 mole % | 230 |
| 6,6-nylon mixing ratio of 60 mole % | 248 |
| 6,6-nylon mixing ratio of 80 mole % | 250 |
| 6,6-nylon mixing ratio of 100 mole % | 265 |

As pointed out hereinbefore, in resins having a barrier property to a gas such as oxygen, for example, ethylene-vinyl alcohol copolymers and nylon resins, the melting or softening point varies depending on the content of a polar group such as a hydroxyl or amide group or the chemical composition.

Data of the oxygen permeability ($PO_2$, cc·cm/cm$^2$·sec·cmHg) as determined at 37° C. in the absolute dry state of ethylene-vinyl alcohol copolymers and polyamides excellent in the barrier property to gases such as oxygen are shown in Table 2 given hereinafter.

Table 2
Oxygen Permeabilities of High Gas-Barrier Resins

| Resin | $PO_2 \times 10^{12}$ cc·cm/cm$^2$·sec·cmHg (at 37° C. and 0% RH) |
|---|---|
| Ethylene-Vinyl Alcohol Copolymers | |
| Vinyl alcohol content of 40 mole % | 3.8 |
| Vinyl alcohol content of 50 mole % | 0.5 |
| Vinyl alcohol content of 60 mole % | 0.1 |
| Vinyl alcohol content of 70 mole % | 0.07 |
| Vinyl alcohol content of 80 mole % | 0.06 |
| Polyamides | |
| 6-Nylon | 4.0 |
| 8-Nylon | 4.5 |
| 11-Nylon | 4.9 |
| 12-Nylon | 5.3 |
| 6,6-Nylon | 0.69 |
| 6,10-Nylon | 0.8 |
| 10,6-Nylon | 0.81 |
| 6-Nylon-6,6-nylon copolymer (6-nylon content = 10 mole %) | 1.0 |
| 6-Nylon-6,6-nylon copolymer (6-nylon content = 30 mole %) | 2.0 |

In this invention, use of a thermoplastic resin having an oxygen permeability ($PO_2$) lower than $4.5 \times 10^{-12}$ cc·cm/cm$^2$·sec·cmHg as determined at 37° C. is preferred, and an ethylene-vinyl alcohol copolymer, especially a saponified ethylene-vinyl acetate copolymer having an ethylene content of 25 to 65 mole % and a degree of saponification of at least 99 mole %, is most preferred. Of course, nylon resins can also be used conveniently. These oxygen-barrier thermoplastic resins should, of course, have a molecular weight sufficient to form a film.

In this invention, in order to obtain a container comprising an oxygen-barrier resin layer (A) and an orienting resin layer (B), in which the orienting resin layer is effectively oriented and the adhesiveness between the two resin layers and the transparency as a whole are excellent, the two resins should be selected so that their melting or softening points satisfy the requirement represented by the above formula (1).

In general, when a parison or sheet having a multi-layer structure is subjected to draw molding or solid phase pressure forming, the interlaminar peel strength between two layers is drastically reduced. It is believed that the reason for reduction of the interlaminar peel strength is that the respective layers show different responses deformation caused from the outside and a force given from the outside, namely they differ from each other in viscoelastic characteristics, unless the layer-constituting resins are thermoplastic resins having quite the same chemical and physical properties and therefore, different stresses or strains are caused in interfaces between every two adjacent layers, resulting in reduction of the adhesive force. This undesirable phenomenon is often observed also in the case where an unsaturated carboxylic acid-modified thermoplastic resin is used as an adhesive layer between a layer of a versatile resin such as polyolefin and a layer of a high gas-barrier resin such as mentioned above.

We found that when a parison or sheet having a multi-layer structure is molded into a container, in order to enhance the transparency and interlaminar peel strength, it is important that a high oxygen-barrier resin such as mentioned above and an orienting resin such as mentioned above should be selected so that the difference ($\Delta t$) between the melting or softening point ($T_B$) of the high oxygen-barrier resin and the melting or softening point ($T_O$) of the orienting resin is not larger than 35° C., and that at least one of two-dimensional orientation coefficients (l and m) of at least one layer of the orienting resin in a smallest-thickness portion of the final molded container should be at least 0.05.

More specifically, it was found that when the melting or softening point ($T_B$) of the high barrier resin is lower than the melting or softening point ($T_O$) of the orienting resin by more than 35° C., under container-molding conditions giving the above-mentioned degree of orientation, the high barrier resin is in the completely molten state and because of extreme thickness unevenness of the high barrier resin layer caused in response to the temperature distribution of the parison or sheet at the molding step or of heat generation caused by solidification or crystallization of the high barrier resin at the cooling stage after the molding step, the orientation and transparency of the orienting resin layer other than the high barrier resin layer are drastically reduced. Moreover, it was found that when the melting or softening point ($T_B$) of the high barrier resin is higher than the melting or softening point ($T_O$) of the orienting resin by more than 35° C., under molding conditions giving the above-mentioned degree of orientation, the high barrier resin is in the relatively viscoelastically solid state and a high stress is generated on the interface between the high barrier resin layer and the adjacent other resin layer, to cause drastic reduction of the interlaminar peel strength in the final molded container. As will be apparent from these findings, it is especially important that the high oxygen-barrier resin and orienting resin should be selected so that the difference ($\Delta t$) between the melting or softening point ($T_B$) of the high oxygen-barrier resin and the melting or softening point ($T_O$) of the orienting resin is not larger than 35° C.

As the orienting thermoplastic resin (B), any of known thermoplastic resins capable of being oriented by drawing, other than the above-mentioned oxygen-barrier thermoplastic resin (A), can be used in this invention, so far as the above-mentioned requirements are satisfied. For example, homopolymers of olefins represented by the following formula:

(4)

wherein R stands for a hydrogen atom or an alkyl group having up to 4 carbon atoms, such as ethylene, propylene, butene-1, pentene-1 and 4-methylpentene-1, copolymers of these olefins, copolymers of these olefins with a small amount, generally 0.05 to 10% by weight based on the olefin, of other ethylenically unsaturated monomer such as vinyl acetate, an acrylic acid ester or the like, and blends of two or more of the foregoing polymers can be preferably employed for production of multi-layer parisons or sheets to be used in this invention, so far as they are crystalline. In order to obtain a molded container excellent in the rigidity and mechanical strength by draw molding, it is very important that homopolymers or copolymers of olefins should be crystalline. As the olefin homopolymer or copolymer, crystalline polypropylene is most preferred in view of the transparency and mechanical properties. In addition, there can be mentioned an ethylenepropylene copolymer, high density polyethylene, poly-4-methylpentene-1, polybutene-1 and medium density polyethylene in an order of importance. As the ethylenepropylene copolymer, a crystalline polymer comprising 0.5 to 15 mole % of ethylene and 85 to 95.5 mole % of propylene is especially valuable. In general, the olefin homopolymer or copolymer to be used should have a molecular weight sufficient to form a film, and it is preferred that the melt index (as determined according to the method of ASTM D-1238) of the olefin homopolymer or copolymer be 0.0001 to 5, especially 0.01 to 2.5.

Another instances of the orienting thermoplastic resin include polycarbonates and thermoplastic acrylic resins. As preferred examples of the polycarbonate, there can be mentioned polymers of carbonic acid esters obtained by reaction of bisphenol with phosgene, and as preferred examples of the acrylic resin, there can be mentioned homopolymers and copolymers of acrylic acid esters and methacrylic acid esters.

In this invention, the orienting resin layer may be a layer of a blend of the orienting thermoplastic resin with other thermoplastic resin, for example, the above-mentioned oxygen-barrier resin or an adhesive resin described hereinafter, so far as the orienting thermoplastic resin is a main component. If this feature is adopted, flashes formed at the step of molding of containers can be used for formation of the orienting resin layers.

In this invention, it is preferred that the oxygen-barrier thermoplastic resin (A) and the orienting thermoplastic resin (B) be selected and combined so that the requirement represented by the following formula:

$$0.61T_O - 56.8 \leq X \leq 0.61T_O - 26.2 \qquad (5)$$

wherein $T_O$ stands for the melting or softening point (°C.) of the orienting thermoplastic resin (B) and X stands for the content (mole %) of the vinyl alcohol units in the oxygen-barrier thermoplastic resin (A), is satisfied.

In this invention, in general, it is preferred that an adhesive resin (C) having an adhesiveness to both the oxygen-barrier thermoplastic resin layer (A) and the orienting thermoplastic resin layer (B) be interposed between the two layers (A) and (B).

Any of known resins having an adhesiveness to the above-mentioned oxygen-barrier thermoplastic resin (A) and orienting thermoplastic resin (B) can be used as the adhesive resin (C). In general, however, as the adhesive polymer (C), there are employed thermoplastic polymers having carbonyl groups

derived from functional groups of free carboxylic acids, carboxylic acid salts, carboxylic acid esters, carboxylic acid amides, carboxylic anhydrides, carbonic acid esters, urethane, urea or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer, especially 30 to 1200 millimoles per 100 g of the polymer. Preferred adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, coconut fatty acid amide and maleimide. In addition, as the adhesive resin, there can be used ethylene-acrylate copolymers, ionomers (such as Surlyn ® manufactured by Du Pont), polyalkylene oxide-polyester block copolymers, carboxylmethyl cellulose derivatives, and blends of these polymers with polyolefins.

In order to draw a parison or sheet having a multi-layer structure under the above-mentioned conditions, the melting or softening point of the adhesive resin is limited.

More specifically, the melting or softening point ($T_C$, °C.) of the adhesive resin (C) should be lower than the melting or softening point ($T_O$, °C.) of the orienting thermoplastic resin (B), and in view of the interlaminar peel strength and moldability of a multi-layer parison or sheet to be drawn, it is preferred that the requirement represented by the following formula:

$$90° C. \geq T_O - T_C \geq 2° C. \tag{2}$$

wherein $T_O$ stands for the melting or softening point (°C.) of the orienting thermoplastic resin (B) and $T_C$ stands for the melting or softening point (°C.) of the adhesive resin (C), be satisfied.

Multi-Layer Structure

The layer structure of the multi-layer container is preferably decided according to the use and physical properties of the container. For example, when the content is a non-aqueous content, a layer of a chemically inactive resin such as a polyolefin need not be used as the innermost layer, but when the content is a food or drink, it is preferred to use a polyolefin considered to be safest from the sanitary viewpoint as the innermost layer. Layer structures including an oxygen-barrier thermoplastic resin layer (designated as "A") and an orienting thermoplastic resin layer (designated as "B" or "B'") optionally with an adhesive resin layer (designated as "C"), which are preferably used in this invention, are as follows:

| (i) | Two-Layer Structure: | |
| --- | --- | --- |
| | B/A | (i) |
| (ii) | Three-Layer Structure: | |
| | B/C/A | (ii-1) |
| | B/A/B | (ii-2) |
| | B/A/B' | (ii-3) |
| (iii) | Four-Layer Structure: | |
| | B/B'/C/A | (iii-1) |
| | B/C/A/C | (iii-2) |
| | B/C/A/B' | (iii-3) |
| (iv) | Five-Layer Structure: | |
| | B/C/A/C/B | (iv-1) |
| | B/C/A/C/B' | (iv-2) |
| | (B + A + C)/C/A/C/(B + A + C) | (iv-3) |
| (v) | Six-Layer Structure: | |
| | B/B'/C/A/C/B | (v-1) |
| | B/(B + A + C)/C/A/C/B | (v-2) |
| (vi) | Seven-Layer Structure: | |
| | B/(B + A + C)/C/A/C/(B + A + C)/B | (vi-1) |
| | B/B'/C/A/C/B'/B | (vi-2) |

Among these multi-layer structures, five-layer structures (iv-1), (iv-2) and (iv-3) and seven-layer structure (vi-1) are especially preferred.

It is preferred that in the above-mentioned multi-layer structure, 0.2 to 50%, especially 2 to 20%, of the total thickness of the final container be occupied by the oxygen-barrier resin layer (A).

Further, it is preferred that the respective resin layers be present in the multi-layer structure at the following thickness ratios:

B:A = from 1:1 to 500:1 and

B:C = from 1:1 to 500:1

Container

In the intended multi-layer draw-molded container or multi-layer solid phase pressure-formed container of the present invention, all the layers constituting the container should not necessarily be draw-molded or solid phase pressure-formed. In this invention, a resin layer in which a relatively excellent transparency cannot be obtained according to the conventional melt-molding method is draw-molded or solid phase pressure-formed. In this invention, it is important to select layer-constituting resins so that at least one of two-dimensional orientation coefficients (l and m) of at least one layer of the final container is at least 0.05.

The two-dimensional orientation coefficients referred to in the instant specification and appended claims can be determined according to the method described in "Polymers, vol. 15, No. 175, page 868" written by Yasunori Nishijima and published by Japanese Association of Polymers in 1966, in which by utilizing optically anisotropic characteristics of a fluorescent molecule, the degree and mode of molecular orientation of a polymer, i.e., a thermoplastic resin, caused by solid deformation or by flowing in the solution or melt state are qualitatively and quantitatively determined. When the two-dimensional orientation in the wall face of the container of this invention is considered in the light of teachings of the above literature reference, the two-dimensional orientation degrees can be quantitatively represented as follows:

$$I_{//}(\omega) = K\phi(l \cdot \cos^4\omega + m \cdot \sin^4\omega + (3/8)n) \tag{6}$$

wherein $I_{//}(\omega)$ stands for the intensity of the polarized component of the fluorescence emitted from a thermoplastic resin as the sample, // indicates that the vibration direction of incident polarized light is in parallel to the direction of measured polarized light, $\omega$ stands for the rotation angle of the sample with respect to the vibration direction of said polarized light, K designates a maximum excitation probability when the molecular axis of the sample is in parallel to the vibration direction of excited fluorescent light, $\phi$ stands for the molecular fluorescent contraction, l designates the ratio of orientation of the molecule in one optional direction in the wall face of the container, m designates the ratio of orientation in a direction rectangular to the orientation direction of l, n stands for the ratio of non-orientation in the wall face, and the sum of l, m and n is 1 (l+m+n=1).

When the adhesive resin (C) is interposed between the oxygen-barrier resin layer (A) and the orienting resin layer (B), it is preferred that the adhesive resin layer (C) be substantially non-oriented.

In accordance with another preferred embodiment of this invention, there is provded a multi-layer container wherein the oxygen-barrier resin and the orienting resin are selected so that the requirement represented by the following formula:

$$\|T_B - T_O\| \leq 10° \text{ C.} \quad (7)$$

wherein $T_B$ and $T_O$ are as defined above, is satisfied, at least one of two-dimensional orientation coefficients (l and m) of at least one layer of the orienting thermoplastic resin in a smallest-thickness portion of the container is at least 0.1, each resin layer has a haze (Hz) lower than 10%, and wherein the bonding strength between every two adjacent layers is at least 20 g/cm.

In order to obtain a container having much preferred transparency and rigidity, it is important that the difference $\Delta t$ should be not larger than 10° C. and at least one of two-dimensional orientation coefficients (l and m) should be at least 0.1. When at least one of the two-dimensional orientation coefficients of the orienting resin layer is at least 0.1, namely when the orienting resin layer is drawn at a relatively high draw ratio, there is observed a tendency that the bonding strength between adjacent layers is reduced, as pointed out hereinbefore. However, we found that if each layer constituting the container has a haze (Hz) lower than 10%, namely if each layer is excellent in the transparency, the peeling is not visually noted under shaking or falling between two adjacent layers, and that this effect can be prominently attained if the interlaminar bonding strength between every two adjacent layers is at least 20 g/cm.

The molded container of this invention has a unit volume (the volume per unit weight, g, of the resin) of 0.01 to 5 dl/g, especially 0.05 to 2 dl/g, though the unit volume is changed to some extent depending on the intended use of the container. The wall thickness of the container of this invention is adjusted in a range of from 0.02 to 1 mm, especially from 0.08 to 0.8 mm. When the unit volume and wall thickness are appropriately chosen within these ranges, a preferred combination of high interlaminar peel strength, high gas-barrier property, high rigidity and high transparency can be attained.

Preparation Process

The container of this invention can be prepared according to a process comprising forming a parison or sheet having the above-mentioned multi-layer structure by co-melt-extrusion, and molding the parison or sheet into a container at a molding temperature (Tm) satisfying the requirement represented by the following formula:

$$|Tm - T_B| \leq 30° \text{ C.} \quad (8)$$

wherein $T_B$ is as defined above and Tm stands for the molding temperature (°C.), and under such conditions that orientation of the orienting thermoplastic resin is caused at least in a smallest-thickness portion of the container.

A parison or sheet having the above-mentioned multi-layer structure can be formed by known molding means. For example, a multi-layer parison can be prepared by concurrent extrusion or injection molding of the above-mentioned resins in a layer structure as mentioned hereinbefore. Further, a multi-layer sheet can be prepared by extruding the above-mentioned resins in a multi-layer structure as mentioned hereinbefore according to known means and molding the extrudate into a sheet according to the known T-die molding method.

The so obtained laminate sheet may be subjected to a post treatment such as rolling.

The importance that the temperature (Tm) for molding the multi-layer parison or sheet under drawing should be in the range satisfying the requirement represented by the formula (8) will be apparent from the illustration given hereinbefore with respect to the resin components.

When the adhesive resin layer (C) is interposed between the oxygen-barrier thermoplastic resin layer (A) and the orienting resin layer (B), it also is important that the multi-layer parison or sheet should be monoaxially or biaxially draw-molded at a temperature (Tm) higher than the melting or softening point $(T_C)$ of the adhesive resin (C) but lower than the melting or softening point $(T_O)$ of the orienting thermoplastic resin (B).

When monoaxial or biaxial draw-molding is carried out at a temperature (Tm) satisfying the requirement represented by the following formula:

$$T_O > Tm \leq T_C \quad (9)$$

according to a preferred embodiment of this invention, drawing is effected while the orienting thermoplastic resin (B) is in the non-softened state and the adhesive resin (C) is in the molten or softened state, and while effective orientation can be given to the orienting thermoplastic resin, the interlaminar peel strength between the orienting thermoplastic resin layer (B) and the oxygen-barrier thermoplastic resin layer (A) can be remarkably enhanced. When draw-molding is carried out at a temperature lower than the melting or softening point of the adhesive resin (C), as shown in Example 7 given hereinafter (see comparative bottle BB), in the resulting draw-molded bottle, delamination is readily caused between the oxygen-barrier resin layer (A) and the orienting resin layer (B) under falling shock or the like. On the other hand, as shown in Example 7 given hereinafter, when draw-molding is carried out at a temperature higher than the melting or softening point of the orienting resin (B), a heated parison (parison will be often referred to as "pipe" hereinafter) is poor in the form-retaining property and it is readily deformed, and it sometime become impossible to perform draw-molding. If draw-molding be possible, the resulting bottle is insufficient in such properties as transparency and smoothness.

In contrast, when the multi-layer parison or sheet is draw-molded at a temperature (Tm) higher than the melting or softening point of the adhesive resin but lower than the melting or softening point of the orienting resin according to this invention, as shown in Examples given hereinafter, a draw-molded container excellent in such properties as rigidity, mechanical strength, transparency and smoothness can be obtained with good moldability and processability. Moreover, the interlaminar peel strength between the oxygen-barrier resin layer (A) and the orienting resin layer (B) can be enhanced to a level exceeding 135 g/cm of the width, and in the resulting container, delamination is not substantially caused under falling shock.

The reason why the interlaminar strength of the container can be prominently improved by conducting draw-molding under the above-mentioned temperature condition according to the present embodiment of this invention has not been completely elucidated, but it is construed that main causes are as follows.

The adhesive resin (C) in the molten or softened state at the draw-molding step has an action of moderating stress or strain generated on the interface between the two resin layers at the draw-molding step, and the interposed adhesive resin (C) present in the molten or softened state promotes drawing of the orienting resin layer (B) or the oxygen-barrier resin layer (A).

Under the above-mentioned draw-molding temperature condition of this embodiment the oxygen-barrier resin layer (A) may be in the molten or softened state or in the non-molten or non-solidified state. For example, when the oxygen-barrier resin (A) is an ethylenevinyl alcohol copolymer, it is preferred that monoaxial or biaxial drawing be carried out while the copolymer is in the molten or softened state. In case of monoaxial drawing, the copolymer may be kept in the non-molten or semi-molten state. On the other hand, when the oxygen-barrier resin (A) is a polyamide resin, in general, there is not such condition.

A hot air circulating passage, an infrared heater, an induction heater, a microwave irradiator, a heater for contact with a heating medium such as steam or heated oil or a combination of these heating means can be used for maintaining the multi-layer parison or sheet at the above-mentioned draw-molding temperature (Tm). Of course, it is possible to perform draw-molding when the temperature of an as-molded parison or sheet having the above-mentioned molded structure is lowered to the above-mentioned draw-molding temperature.

In this invention, in view of such properties as rigidity, mechanical strength and transparency of the resulting container, it is preferred that the multi-layer parison or sheet be drawn to such as extent that at least one of two-dimensional orientation coefficients (l and m) of at least one layer of the orienting resin in a smallest-thickness portion of the container is at least 0.05.

For attaining this feature, in general, it is preferred that the draw ratio of the multi-layer parison or sheet be 1.1 to 20, especially 1.5 to 5. The drawing speed at the step of forming the multi-layer parison or sheet into a container differs depending on the kind of the resin, and the drawing speed is appropriately decided within a range causing the above-mentioned drawing effect. It is especially preferred that the drawing speed be in a range of from 10%/mm to 6,000,000%/mm.

In this invention, draw-molding of the multi-layer parison or sheet into a container can be performed under the same conditions as known molding conditions except that the molding temperature (Tm) is maintained within the above-mentioned range and drawing is carried out to such an extent that at least one of two-dimensional orientation coefficients (l and m) is at least 0.05, especially at least 0.1.

For example, formation of a bottle from the multi-layer parison can be accomplished by drawing of the parison in the axial direction by holding means or a mandrel and drawing of the parison in the lateral direction by blow-in of a fluid. Steps of drawing the parison in the axial direction and in the lateral direction may be conducted concurrently or in sequence.

Formation of a container such as a cup from the multi-layer sheet can be accomplished by plug-assist forming (vacuum molding), air-pressure forming, sheet blow molding, draw forming, draw-ironing molding, compression molding, forward extrusion, backward extrusion, forward-backward extrusion and explosion forming. In the instant specification, these forming methods are collectively called "draw forming method".

When draw-molding is carried out under the above-mentioned conditions according to this invention, a container excellent in transparency, rigidity and gas-barrier property and having especially high interlaminar peel strength can be obtained. Further, by virtue of the drawing effect, it is made possible to reduce the wall thickness of the container, decrease the weight of the container and reduce amounts used of resins drastically.

Uses

The container of this invention has a desirable combination of gas-barrier property, rigidity, transparency and interlaminar peel strength, and they can be valuably applied to various uses.

Because of these advantages, the container of the present invention is very useful for preserving, without substantial deterioration or quantity loss, various liquid and pasty foods and drinks, for example, bubbling alcoholic drinks such as beer, other alcoholic drinks such as Japanese sake, whisky, distilled spirits, wines, gin fizz and other cocktails, carbonated drinks such as cola, cider and plain soda, fruit drinks such as straight fruit juices, e.g., lemon juice, orange juice, plum juice, grape juice and strawberry juice and processed fruit juices, e.g., Nector ®, vegetable juices such as tomato juice, synthetic drinks and vitamin-incorporated drinks formed by blending a saccharide such as sugar or fructose, citric acid, a colorant and a perfume optionally with vitamins, lactic acid beverages, stews, e.g., pre-cooked curry, pre-cooked hash, borsch and beef stew, gravy, e.g., meat sauce, boiled vegetables, fishes and meats, e.g., vinegared pork, sukiyaki, Chinese food paste of beef and vegetables, Chinese hotchpotch, boiled spinach, boiled mushroom, boiled asparagus, boiled beans, boiled corn and cream-boiled tuna, soups, e.g., consome soup, potage soup, miso soup, pork-incorporated miso soup and vegetable soup cooked with oil, rice foods, e.g., boiled rice, rice boiled with red beans, toasted boiled rice, frizzled boiled rice, pilaff and rice-gruel, noodles, e.g., spaghetti, buck-wheat vermicelli, wheat vermicelli, Chinese noodle and Italian noodle, compound condiments, e.g., those for toasted boiled rice or Chinese noodle soup, luxury foods, e.g., tasted boiled red beans, thick and thick bean-meal soups with sugar, sugared and boiled beans with rice cake or fruits and jelly, boiled beans with treacle poured on, custard pudding, jelly cakes and soft adzuki-bean jelly, processed fish and meat products, e.g., meat dumpling, hamburger, corn beaf, ham, sausage, roast fish, smoked fish, bacon and boiled fish paste, fruit products, e.g., processed orange, peach, pine-apple, cherry and apple, condiments such as soy, sauce, vinegar, sweet sake, dressing, mayonnaise, ketchup, soybean paste, lard and edible oil, and foods such as bean curd, jam, butter and margarine; liquid medicines, liquid agricultural chemicals, liquid cosmetics and detergents; ketones such as acetone and methylethyl ketone; aliphatic hydrocarbons such as n-hexane and n-heptane; alicyclic hydrocarbons such as cyclohexane; aromatic hydrocarbons such as benzene, toluene and xylene; chlorine-containing carbon tetrachloride, tetrachloroethane and tetrachloroethylene; liquid fuels and oils such as gasoline, kerosine, petroleum bendine, fuel oil, thinner, grease, silicone oil, light oil and machine oil; and liquefied Freon (the trademark of a product manufactured by Du Pont).

This invention will now be described by reference to the following Examples that by no means limit the scope of the invention.

EXAMPLE 1

Parisons having both the ends opened and having an inner diameter of 10 mm, a length of 185 mm and a thickness of 7.5 mm and parisons having both the ends opened and having an inner diameter of 15 mm, a length of 100 mm and a thickness of 4.5 mm were prepared from the following 24 combinations of innermost and outermost layers, intermediate layers and adhesive layers by using an extruder for forming innermost and outermost layers, which included a full-flighted screw having a diameter of 65 mm and an effective length of 1430 mm and was provided with a melt channel divided into two flow passages, an extruder for forming adhesive layers, which included a full-flighted screw having a diameter of 40 mm and an effective length of 880 mm and was provided with a melt channel divided into two flow passages, an extruder for forming intermediate layers, which included a full-flighted screw having a diameter of 40 mm and an effective length of 880 mm, a 5-ply die, a pipe former and a pipe cutter.

Resins used for formation of intermediate layers are as follows:

EV1:
Ethylene-vinyl alcohol copolymer having an ethylene content of 45 mole %, a vinyl alcohol content of 55 mole %, a melting point of 154° C. as measured according to the differential thermal analysis method (hereinafter referred to as "DTA method") in which the temperature-elevating rate was 10° C./mm, and an oxygen permeability ($PO_2$) of $0.23 \times 10^{-12}$ cc·cm/cm²·sec·cmHg as measured at a temperature of 37° C. and a relative humidity of 0%.

EV2:
Ethylene-vinyl alcohol copolymer having an ethylene content of 30 mole %, a vinyl alcohol content of 70 mole %, a melting point of 181° C. as measured according to the above-mentioned DTA method and an oxygen permeability of $0.07 \times 10^{-12}$ cc·cm/cm²·sec·cmHg as measured under the above-mentioned conditions.

EV3:
Ethylene-vinyl alcohol copolymer having an ethylene content of 19 mole %, a vinyl alcohol content of 81 mole %, a melting point of 197° C. as measured according to the above-mentioned DTA method and an oxygen permeability of $0.059 \times 10^{-12}$ cc·cm/cm²·sec·cmHg as measured under the above-mentioned conditions.

EV4:
Ethylene-vinyl alcohol copolymer having an ethylene content of 66 mole %, a vinyl alcohol content of 34 mole %, a melting point of 120° C. as measured according to the above-mentioned DTA method and an oxygen permeability of $5.4 \times 10^{-12}$ cc·cm/cm²·sec·cmHg as measured under the above-mentioned conditions.

Resins used for formation of innermost and outermost layers are as follows:

PP1:
Isotactic polypropylene having a density of 0.909 g/cc and a melting point of 159° C. as measured according to the above-mentioned DTA method.

PP2:
Ethylene-propylene random copolymer having a density of 0.90 g/cc, a melting point of 154° C. as measured according to the above-mentioned DTA method and an ethylene content of 10 mole %.

Resins used for formation of adhesive layers are as follows:

AH1:
Unsaturated carboxylic acid-modified polypropylene having a density of 0.90 g/cc and a melting point of 159° C. as measured according to the above-mentioned DTA method.

AH2:
Unsaturated carboxylic acid-modified polypropylene having a density of 0.90 g/cc and a melting point of 154° C. as measured according to the above-mentioned DTA method.

AH3:
Resin blend having a density of 0.90 g/cc and being composed of unsaturated carboxylic acid-modified polyethylene having a melting point of 105° C. as measured according to the above-mentioned DTA method and an unsaturated carboxylic acid-modified polypropylene having a melting point of 155° C. as measured according to the above-mentioned DTA method.

These pipes (parisons) were heated for about 30 minutes in a hot air-circulated oven maintained precisely at an atmosphere temperature of 155° C. Then, pipes having an inner diameter of 10 mm, a length of 185 mm and a thickness of 4.5 mm were formed into bottles having a thickness of 0.6 mm, an inner capacity of 300 cc and a weight of 22 to 24 g/bottle according to the sequent biaxial draw-blowing method at a draw ratio of 3 in the longitudinal direction (the bottle height direction) and at a draw ratio of 3.5 in the lateral direction (the bottle circumference direction). Bottles having the same dimensions as described above were prepared from pipes having an inner diameter of 15 mm, a length of 100 mm and a thickness of 4.5 mm according to the same sequent biaxial draw-blowing method at a draw ratio of 1.5 in the longitudinal direction and at a draw ratio of 1.5 in the lateral direction.

For comparison, cylindrical multi-layer bottles having the same dimensions as described above were prepared from some of 24 combinations according to the known direct blow-molding method (blow-molding of molten parisons) in which multi-layer parisons as-extruded from the 5-ply die and in the molten state were immediately blow-molded.

In each case, the molding was carried out carefully so that the thickness ratio of innermost or outermost layer/adhesive layer/intermediate layer was as close to 100:1:3 as possible.

With respect to each of the so prepared 58 kinds of bottles, the oxygen transmission rate ($QO_2$), the haze (Hz) and the orientation coefficients (l, m and n) of the innermost and outermost layers were determined according to the method disclosed in Japanese Patent Application Laid-Open Specification No. 49379/75, the measuring method of JIS K-6714 and the above-mentioned fluorescence method, respectively. Further, with respect to each kind of bottles, 10 sample bottles were chosen and 340 g of an aqueous solution of table salt was filled in each bottle. Then, the filled bottles were allowed to stand in an atmosphere maintained at −1° C. over 3 days and nights, and immediately, they were let to fall on a concrete floor from a height of 1.2 m in an atmosphere maintained at 20° C. so that bottle bottoms were caused to hit on the concrete floor. Then, the falling strength represented by the following formula:

$$F_B = 100 \times [10 - F_1]/10$$

wherein $F_1$ stands for the number of bottles broken at the first falling test and $F_B$ denotes the falling strength, was determined. Further, occurrence of delamination was visually examined by a panel of 5 men (the occurrence of delamination was evaluated based on an average value of the number N of bottles where delamination took at the first falling test). From each bottle, specimens having a width of 10 mm and a length of 50 mm were cut off in both the vertical direction and circumferential direction of the bottle wall, and the peel strength (AT) was measured at a peeling rate of 100 mm/min in an atmosphere maintained at a temperature of 20° C. and a relative humidity of 60%. Results of these tests are shown in Table 3.

In Table 3, symbols of bottles are expressed by numbers of four figures. The thousands digit indicates the material of the intermediate layer. For example, "1", "2", "3" and "4" indicate EV1, EV2, EV3 and EV4, respectively. Similarly, the hundreds digit indicates the material of the adhesive layer and the tens digit indicates the material of the outermost and innermost layers, and the expression manner is the same as in case of the intermediate layer. The units digits indicate kinds of bottles. More specifically, "1", "2" and "3" represent a draw-blow molded bottle drawn at a draw ratio of 1.5 in the longitudinal direction and at a draw ratio of 1.5 in the lateral direction, a draw-blow molded bottle drawn at a draw ratio of 3.5 in the lateral direction and at a draw ratio of 3 in the longitudinal direction, and a comparative bottle formed by the above-mentioned direct blow-molding method, respectively. For example, symbol 2122 indicates a biaxially drawn blow-molded bottle comprising an intermediate layer of EV2, an adhesive layer of AH1 and innermost and outermost layers of PP1, in which the draw ratio in the lateral direction is 3.5 and the draw ratio in the longitudinal direction is 3.

From the results shown in Table 3, it will readily be understood that biaxially drawn blow-molded bottles are apparently excellent over directly blow-molded bottles with respect to the oxygen barrier property and transparency, and that although the directly blow-molded bottles are excellent over biaxially drawn blow-molded bottles with respect to the adhesion strength, the latter bottles are excellent over the former bottles with respect to the interlaminar peel strength determined by the visual test, namely the practical peel strength. It will also be understood that if the intermediate layer excellent in the barrier property to gases such as oxygen is selected so that the above-mentioned requirements of this invention are satisfied, the oxygen-barrier property, transparency and interlaminar peel strength can be remarkably improved in the resulting container.

Table 3

| Symbol of Bottle | $QO_2$, $cc/m^2 \cdot day \cdot atm$ | Hz[%] Intermediate Layer | Hz[%] Innermost and Outermost Layers plus Adhesive Layer | Hz[%] Bottle | Orientation Co-efficients (innermost and outermost layers) l | Orientation Co-efficients (innermost and outermost layers) m | Orientation Co-efficients (innermost and outermost layers) n |
|---|---|---|---|---|---|---|---|
| 1111 | 7.3 | <1 | 13 | 14 | 0.11 | 0.12 | 0.77 |
| 1112 | 6.0 | <1 | 7 | 8 | 0.23 | 0.32 | 0.45 |
| 1113 | 8.0 | <2 | 30 | 33 | 0.02 | 0.03 | 0.95 |
| 1121 | 7.2 | <1 | 12 | 13 | 0.07 | 0.09 | 0.84 |
| 1122 | 6.1 | <1 | 6 | 6 | 0.15 | 0.19 | 0.66 |
| 1123 | 9.0 | <2 | 23 | 24 | 0.03 | 0.02 | 0.95 |
| 1211 | 7.2 | <1 | 12 | 13 | 0.09 | 0.10 | 0.81 |
| 1212 | 6.2 | <1 | 7 | 7 | 0.22 | 0.31 | 0.47 |
| 1213 | 8.1 | <2 | 31 | 33 | 0.01 | 0.02 | 0.97 |
| 1221 | 7.1 | <1 | 12 | 14 | 0.09 | 0.11 | 0.80 |
| 1222 | 6.1 | <1 | 6 | 7 | 0.14 | 0.18 | 0.68 |
| 1223 | 8.2 | <2 | 22 | 23 | 0.03 | 0.04 | 0.93 |
| 1311 | 7.2 | <1 | 14 | 15 | 0.15 | 0.14 | 0.71 |
| 1312 | 6.4 | <1 | 7 | 8 | 0.21 | 0.25 | 0.54 |
| 1313 | 8.1 | <2 | 31 | 32 | 0.02 | 0.03 | 0.95 |
| 1321 | 7.3 | <1 | 12 | 12 | 0.08 | 0.08 | 0.84 |
| 1322 | 6.4 | <1 | 6 | 6 | 0.13 | 0.18 | 0.69 |
| 1323 | 8.0 | <2 | 24 | 25 | 0.01 | 0.04 | 0.95 |
| 2111 | 2.4 | <1 | 13 | 15 | 0.10 | 0.11 | 0.79 |
| 2112 | 2.1 | <1 | 7 | 9 | 0.25 | 0.32 | 0.43 |

| Symbol of Bottle | Falling Test $F_B(\%)$ | Falling Test (number of bottles) | Peel Strength (g/cm of width) Vertical direction of bottle | Peel Strength (g/cm of width) Circumferential direction of bottle |
|---|---|---|---|---|
| 1111 | 90 | 1 | 126 | 132 |
| 1112 | 100 | 0 | 32 | 40 |
| 1113 | 40 | 2 | 221 | 230 |
| 1121 | 100 | 0 | 151 | 158 |
| 1122 | 100 | 0 | 29 | 38 |
| 1123 | 70 | 1 | 230 | 241 |
| 1211 | 90 | 0 | 131 | 140 |
| 1212 | 100 | 0 | 22 | 31 |
| 1213 | 40 | 1 | 218 | 221 |
| 1221 | 100 | 1 | 142 | 153 |
| 1222 | 100 | 0 | 63 | 72 |
| 1223 | 70 | 2 | 292 | 291 |
| 1311 | 80 | 0 | 141 | 150 |
| 1312 | 100 | 0 | 69 | 83 |
| 1313 | 40 | 1 | 289 | 293 |
| 1321 | 100 | 0 | 150 | 163 |
| 1322 | 100 | 0 | 70 | 84 |
| 1323 | 80 | 0 | 288 | 296 |

Table 3-continued

| | | | | | |
|---|---|---|---|---|---|
| 2111 | 90 | 0 | 148 | | 161 |
| 2112 | 100 | 0 | 58 | | 73 |

| Symbol of Bottle | QO₂, cc/m² · day · atm | Hz[%] Intermediate Layer | Hz[%] Innermost and Outermost Layers plus Adhesive Layer | Bottle | Orientation Co-efficients (innermost and outermost) layers l | m | n |
|---|---|---|---|---|---|---|---|
| 2113 | 2.8 | <1 | 30 | 32 | 0.02 | 0.03 | 0.95 |
| 2121 | 2.3 | <1 | 12 | 13 | 0.08 | 0.09 | 0.83 |
| 2122 | 2.2 | <1 | 6 | 7 | 0.14 | 0.19 | 0.67 |
| 2123 | 2.9 | <1 | 23 | 25 | 0.02 | 0.03 | 0.95 |
| 2211 | 2.4 | <1 | 11 | 12 | 0.09 | 0.09 | 0.82 |
| 2212 | 2.2 | <1 | 7 | 7 | 0.21 | 0.28 | 0.51 |
| 2213 | 3.1 | <1 | 30 | 32 | 0.02 | 0.03 | 0.95 |
| 2221 | 2.3 | <1 | 12 | 13 | 0.08 | 0.08 | 0.84 |
| 2222 | 2.1 | <1 | 6 | 7 | 0.15 | 0.20 | 0.65 |
| 2223 | 2.9 | <1 | 22 | 23 | 0.01 | 0.04 | 0.95 |
| 2311 | 2.2 | <1 | 14 | 15 | 0.10 | 0.08 | 0.82 |
| 2312 | 2.0 | <1 | 7 | 8 | 0.28 | 0.32 | 0.40 |
| 2321 | 2.9 | <1 | 12 | 14 | 0.09 | 0.08 | 0.83 |
| 2322 | 2.1 | <1 | 6 | 7 | 0.14 | 0.20 | 0.66 |
| 3111 | 2.0 | <1 | 13 | 15 | 0.11 | 0.09 | 0.80 |
| 3112 | 35.0 | <1 | 7 | 7 | 0.24 | 0.29 | 0.47 |
| 3121 | 2.1 | <1 | 12 | 13 | 0.08 | 0.09 | 0.83 |
| 3122 | 1.9 | <1 | 6 | 7 | 0.14 | 0.20 | 0.66 |
| 3211 | 2.0 | <1 | 11 | 13 | 0.10 | 0.09 | 0.81 |
| 3212 | 21.0 | <1 | 7 | 8 | 0.24 | 0.28 | 0.48 |

| Symbol of Bottle | Falling Test F_B (%) | (number of bottles) | Peel Strength (g/cm of width) Vertical direction of bottle | Circumferential direction of bottle |
|---|---|---|---|---|
| 2113 | 40 | 1 | 291 | 301 |
| 2121 | 100 | 0 | 150 | 158 |
| 2122 | 100 | 0 | 59 | 76 |
| 2123 | 70 | 2 | 293 | 294 |
| 2211 | 90 | 0 | 146 | 153 |
| 2212 | 100 | 0 | 53 | 72 |
| 2213 | 30 | 1 | 289 | 293 |
| 2221 | 100 | 0 | 151 | 161 |
| 2222 | 100 | 0 | 59 | 78 |
| 2223 | 60 | 1 | 291 | 293 |
| 2311 | 100 | 0 | 145 | 146 |
| 2312 | 100 | 0 | 52 | 63 |
| 2321 | 100 | 0 | 138 | 151 |
| 2322 | 100 | 0 | 72 | 71 |
| 3111 | 90 | 1 | 109 | 113 |
| 3112 | 100 | 2 | 19 | 19 |
| 3121 | 100 | 1 | 111 | 114 |
| 3122 | 100 | 2 | 20 | 19 |
| 3211 | 80 | 1 | 99 | 103 |
| 3212 | 100 | 1 | 17 | 21 |

| Symbol of Bottle | QO₂, cc/m² · day · atm | Hz[%] Intermediate Layer | Hz[%] Innermost and Outermost Layers plus Adhesive Layer | Bottle | Orientation Co-efficients (innermost and outermost) layers l | m | n |
|---|---|---|---|---|---|---|---|
| 3221 | 2.0 | <1 | 12 | 14 | 0.07 | 0.08 | 0.85 |
| 3222 | 2.2 | <1 | 6 | 7 | 0.15 | 0.19 | 0.66 |
| 3311 | 1.9 | <1 | 14 | 15 | 0.12 | 0.11 | 0.77 |
| 3312 | 24.0 | <1 | 7 | 7 | 0.21 | 0.27 | 0.52 |
| 3321 | 2.1 | <1 | 12 | 15 | 0.09 | 0.09 | 0.82 |
| 3322 | 53.0 | <5 | 6 | 7 | 0.14 | 0.018 | 0.68 |
| 4111 | 95.0 | <5 | 15 | 17 | 0.10 | 0.11 | 0.79 |
| 4112 | 78.2 | <5 | 11 | 12 | 0.21 | 0.27 | 0.52 |
| 4121 | 91.0 | <5 | 13 | 18 | 0.08 | 0.09 | 0.83 |
| 4122 | 76.0 | <5 | 10 | 12 | 0.14 | 0.16 | 0.70 |
| 4211 | 83.0 | <5 | 14 | 15 | 0.12 | 0.11 | 0.77 |
| 4212 | 80.0 | <5 | 11 | 13 | 0.23 | 0.31 | 0.46 |
| 4221 | 93.0 | <5 | 14 | 16 | 0.09 | 0.08 | 0.83 |
| 4222 | 73.2 | <5 | 11 | 12 | 0.15 | 0.23 | 0.62 |
| 4311 | 86.5 | <5 | 15 | 17 | 0.13 | 0.11 | 0.76 |
| 4312 | 72.4 | <5 | 12 | 14 | 0.22 | 0.34 | 0.44 |
| 4321 | 91.3 | <5 | 15 | 16 | 0.08 | 0.09 | 0.83 |
| 4322 | 70.7 | <5 | 10 | 12 | 0.14 | 0.22 | 0.64 |

Table 3-continued

| Symbol of Bottle | Falling Test | | Peel Strength (g/cm of width) | |
|---|---|---|---|---|
| | $F_B$ (%) | (number of bottles) | Vertical direction of bottle | Circumferential direction of bottle |
| 3221 | 100 | 1 | 115 | 116 |
| 3222 | 100 | 2 | 21 | 23 |
| 3311 | 80 | 1 | 103 | 106 |
| 3312 | 90 | 1 | 19 | 21 |
| 3321 | 100 | 2 | 139 | 148 |
| 3322 | 100 | 2 | 21 | 23 |
| 4111 | 90 | 2 | 117 | 121 |
| 4112 | 100 | 1 | 31 | 29 |
| 4121 | 100 | 2 | 117 | 118 |
| 4122 | 100 | 2 | 29 | 33 |
| 4211 | 90 | 1 | 119 | 123 |
| 4212 | 100 | 1 | 31 | 42 |
| 4221 | 100 | 0 | 120 | 131 |
| 4222 | 100 | 1 | 41 | 52 |
| 4311 | 80 | 1 | 125 | 128 |
| 4312 | 100 | 0 | 51 | 62 |
| 4321 | 90 | 0 | 131 | 130 |
| 4322 | 100 | 1 | 61 | 59 |

EXAMPLE 2

Symmetric 5-layer sheets having a thickness of 0.8 mm and a width of 450 mm were formed by using an extruder for forming innermost and outermost layers, which included a full-flighted screw having a diameter of 65 mm and an effective length of 1430 mm, an extruder for forming adhesive layers, which included a full-flighted screw having a diameter of 40 mm and an effective length of 880 mm, an extruder for forming intermediate layers, which included a full-flighted screw having a diameter of 40 mm and an effective length of 880 mm, a T-die equipped with a multi-channel adaptor and having a lip width of 0.6 mm and a lip length of 500 mm, and a sheet-forming machine. The ethylene-vinyl alcohol copolymers EV1, EV2, EV3 and EV4 described in Example 1 were used as the intermediate layer-constituting material. An ethylene-propylene copolymer having a density of 0.9 g/cc, a melting point of 156° C. as measured according to the DTA method, a melt index of 1.6 dg/min as measured according to the method of JIS K-6758 and an ethylene content of 10 mole % was used as the material of the innermost and outermost layers. An unsaturated carboxylic acid-modified ethylene-propylene copolymer having a density of 0.90 g/cc, a melting point of 154° C. as measured according to the DTA method and a melt index of 2.0 dg/min as measured according to the above-mentioned method was used as the adhesive layer-constituting material. The sheet forming operation was carried out by adjusting the amounts of resins extruded from the three extruders so that the thickness ratio of innermost or outermost layer/adhesive layer/intermediate layer was as close to 100:1:3 as possible. The so formed 4 kinds of sheets were heated for about 15 minutes in a hot air-circulated oven having an atmosphere maintained precisely at 155° C. and they were formed into cups having a diameter of 85 mm, a height of 50 mm, an inner capacity of 300 cc and a unit weight of 9 to 10 g/cup according to the plug assist vacuum forming method disclosed in the specification of co-pending U.S. Application Ser. No. 750,376.

For comparison, cylindrical cups having the same dimensions as described above were formed from the above-mentioned 4 kinds of sheets according to the conventional sheet-blowing method, in which the sheets as-extruded from the T-die and in the molten state were blow-molded.

Cups formed according to the plug assist vacuum forming method (solid phase forming method) using EV1 as the intermediate layer are designated as "SP1", and cups formed by the molten sheet blow-molding method using EV1 are designated as "SB1". Similarly, cups formed by using EV2, EV3 and EV4 according to the plug assist vacuum forming method are designated as "SP2", "SP3" and "SP4", respectively, and cups formed by using EV2, EV3 and EV4 according to the molten sheet blow-molding method are designated as "SB2", "SB3" and "SB4", respectively.

With respect to each of the foregoing 8 kinds of cups, the oxygen transmission rate ($QO_2$), the haze (Hz) and the orientation coefficients (l, m and n) were determined according to the methods described in Example 1. Further, 10 sample cups were chosen from each kind of cups, and 340 g of an aqueous solution of table salt was filled in each cup. The filled cups were allowed to stand in an atmosphere maintained at $-1°$ C. over 3 nights and days, and immediately, the cups were subjected to the free vibration test under conditions of a vibration frequency of 400 cpm, a vibration amplitude of 20 mm and an acceleration of 1.8 G for 30 minutes by using a Matsudaira type vibration tester and the number (N) of broken cups were counted. Further, occurrence of delamination was visually tested by a panel of 5 men (the occurrence of delamination was evaluated based on an average number (ADN) of cups where delamination took place). The thickness unevenness of the intermediate layer in molded cups was examined in both the vertical and circumferential direction of the cup and standard deviations δL and δH were determined. Results of these tests are shown in Table 4.

As will be apparent from the results shown in Table 4, the solid phase pressure-formed cups are excellent over directly melt-molded cups with respect to the oxygen-barrier property and transparency. It will also be understood that if the intermediate layer is selected so that the requirements of this invention are satisfied, the resulting cups (samples SP1 and SP2) are much excellent in the interlaminar peel strength and the thickness uniformity of the intermediate layer.

Table 4

| Symbol of Cup | QO$_2$, cc/m$^2$ · day · atm | Hz[%] Intermediate Layer | Hz[%] Innermost and Outermost Layers plus Adhesive Layer | Cup | Orientation Coefficients (innermost and outermost layers) l | m | n |
|---|---|---|---|---|---|---|---|
| SP1 | 8.3 | <1 | 7 | 8 | 0.31 | 0.13 | 0.56 |
| SP2 | 3.1 | <1 | 6 | 7 | 0.41 | 0.09 | 0.50 |
| SP3 | 3.0 | <1 | 6 | 7 | 0.29 | 0.15 | 0.56 |
| SP4 | 93.2 | <1 | 16 | 18 | 0.32 | 0.15 | 0.53 |
| SB1 | 13.2 | <2 | 23 | 24 | 0.03 | 0.01 | 0.96 |
| SB2 | 10.1 | <2 | 22 | 22 | 0.04 | 0.02 | 0.94 |
| SB3 | 9.6 | <2 | 21 | 22 | 0.02 | 0.01 | 0.97 |
| SB4 | 142 | <2 | 23 | 24 | 0.03 | 0.01 | 0.96 |

| Symbol of Cup | Results of Vibration Test N | Results of Vibration Test ADN | Thickness Unevenness of Intermediate Layer δL | Thickness Unevenness of Intermediate Layer δH |
|---|---|---|---|---|
| SP1 | 0 | 0 | 0.20 | 0.09 |
| SP2 | 0 | 0 | 0.15 | 0.09 |
| SP3 | 0 | 2 | 0.23 | 0.10 |
| SP4 | 0 | 1 | 0.62 | 0.31 |
| SB1 | 0 | 1 | 0.21 | 0.13 |
| SB2 | 1 | 1 | 0.22 | 0.12 |
| SB3 | 0 | 2 | 0.20 | 0.15 |
| SB4 | 1 | 3 | 0.21 | 0.11 |

EXAMPLE 3

By using the same molding equipment as used in Example 1, symmetric five-layer parisons composed of three kinds of resins were prepared, and bottles having a symmetric 5-layer structure were formed from these parisons according to the sequent biaxial draw-blow forming method in which the drawing operation was carried out at 159° C. at a draw ratio of 3 in the longitudinal direction and at a draw ratio of 3.5 in the lateral direction. An ω-aminocaproic acid polymer (N1) having a melting point of 223° C. as measured according to the DTA method, a relative viscosity of 1.9 as measured with respect to a solution of 1 g of the polymer in 100 cc of 98% concentrated sulfuric acid and an oxygen permeability of $4.0 \times 10^{-12}$ cc·cm/cm$^2$sec·cmHg as measured at a temperature of 37° C. and a relative humidity of 0% and a caprolactam/hexamethylene diammonium adipate copolymer (N2) having a melting point of 163° C. as measured according to the DTA method, a relative viscosity of 3.4 as measured in the same manner as described above, an oxygen permeability of $3.5 \times 10^{-12}$ cc·cm/cm$^2$·sec·cmHg as measured in the same manner as described above and a caprolactam concentration of 81 mole % were used as the intermediate layer-constituting material. An unsaturated carboxylic acid-modified polypropylene having a density of 0.90 g/cc and a melting point of 156° C. as measured according to the DTA method was used as the material of the adhesive layer adjacent to the intermediate layer. An isotactic polypropylene having a density of 0.909 g/cc and a melting point of 160° C. as measured according to the DTA method was used as the material constituting the innermost and outermost layers.

For comparison, with respect to each of the foregoing two combinations of resins, in the same manner as described in Example 1, bottles were formed from multi-layer parisons extruded from the 5-ply die and still in the molten state according to the direct blow molding method.

Configurations of the so formed 4 kinds of bottles were the same as those described in Example 1. The amounts of resins extruded from the three extruders were adjusted so that the thickness ratio of innermost or outermost layer/adhesive layer/intermediate layer was as close to 100:2:1 as possible.

With respect to each of these 4 kinds of bottles, the oxygen transmission rate (QO$_2$), haze (Hz), orientation coefficients, falling strength (F$_B$) and interlaminar peel strength were determined according to the same methods as described in Example 1, and the number (N) of broken bottles and occurrence of delamination at the vibration test and the standard deviations δL and δH indicating the thickness unevenness of the intermediate layer were determined according to the same methods as described in Example 2. Results of these tests are shown in Table 5. In Table 5, bottle symbols indicate the following bottles:

BO1:
Biaxially drawn blow-formed bottles containing N1 as the intermediate layer-constituting material.

BO2:
Biaxially drawn blow-formed bottles containing N2 as the intermediate layer-constituting material.

DO1:
Directly blow-molded bottles (formed by blow molding of molten parisons) containing N1 as the intermediate layer-constituting material.

DO2:
Directly blow-molded bottles containing N2 as the intermediate layer-constituting material.

From the results shown in Table 5, it will readily be understood that BO2 bottles formed by selecting the intermediate layer so that the requirements of the present Invention are satisfied are much excellent in the oxygen-barrier property, falling strength, strength and delamination resistance at the vibration test and thickness uniformity of the intermediate layer.

Table 5

Hz[%]

Table 5-continued

| Symbol of Bottle | $QO_2$, cc/m² . day . atm | Intermediate Layer | Innermost and Outermost Layers plus Adhesive Layer | | Orientation Coefficients (innermost and outermost layers) | | |
|---|---|---|---|---|---|---|---|
| | | | | Bottle | l | m | n |
| BO1 | 56.2 | <2 | 7 | 8 | 0.23 | 0.31 | 0.46 |
| BO2 | 19.1 | <2 | 6 | 7 | 0.22 | 0.30 | 0.48 |
| DO1 | 41.5 | <5 | 31 | 33 | 0.02 | 0.01 | 0.97 |
| DO2 | 36.9 | <5 | 32 | 34 | 0.03 | 0.02 | 0.95 |

| Symbol of Bottle | Falling Test Results | | Vibration Test Results | | Thickness Unevennesss of Intermediate Layer | |
|---|---|---|---|---|---|---|
| | FB (%) | N (number of broken bottles) | N | ADN | δL | δH |
| BO1 | 100 | 3 | 0 | 1 | 0.35 | 0.12 |
| BO2 | 100 | 0 | 0 | 0 | 0.15 | 0.09 |
| DO1 | 40 | 0 | 0 | 0 | 0.21 | 0.10 |
| DO2 | 50 | 1 | 1 | -1 | 0.20 | 0.11 |

EXAMPLE 4

Sheets having a thickness of 0.5 mm and a width of about 400 mm and having a symmetric 5-layer structure were prepared by using a known extruding and sheet-forming machine.

The same ω-aminocaproic acid polymer (6-nylon, N1) as used in Example 3, 6,6-nylon (N3) having a melting point of 265° C. according to the DTA method in which the temperature-elevating rate was 10° C./min and an oxygen permeability of $0.69 \times 10^{-12}$ cc·cm/c-m²·sec·cmHg as measured at a temperature of 37° C. and a relative humidity of 0%, and an 80/20 (weight ratio) mixture (N13) of 6-nylon and 6,6-nylon having a melting point of 228° C. as measured according to the above DTA method and an oxygen permeability of $2.2 \times 10^{-12}$ cc·cm/cm²·sec·cmHg were used as the intermediate layer-constituting resin. A 4-methyl-pentene-1 polymer (manufactured and sold under tradename "TPX" by ICI) having a density of 0.835 g/cc, a melting point of 228° C. as measured according to the above DTA method and a melt index of about 7.0 as measured under conditions of a load of 5 Kg and a temperature of 265° C. was used as the resin constituting innermost and outermost layers. Adhesive polypropylene (manufactured and sold under tradename "MODIC" by Mitsubishi Petrochemical) having a density of 0.90 g/cc, a melting point of 153° C. as measured according to the above DTA method and a melt index of 2.4 as measured according to the method of JIS K-6760 was used as the resin constituting an adhesive layer interposed between the innermost or outermost layer and the intermediate layer. In the same manner as described in Example 2, the sheet-forming operation was carried out while adjusting the rotation number of the screw so that the innermost or outermost layer/adhesive layer/intermediate layer thickness ratio was as close to as 100:5:10 as possible.

The so prepared three kinds of sheets were sufficiently heated in a hot air-circulated oven installed with an infrared heater maintained precisely at a molding temperature indicated in Table 6, and they were formed into cylindrical cups having a diameter of 85 mm, a height of 50 mm, an inner capacity of 300 cc and a unit weight of 9 to 10 g per cup according to the known plug assist air-pressure forming method.

For comparison, the foregoing three kinds of sheets were heated at 250° C. in the above-mentioned oven just after formation of the sheets and they were formed into cylindrical cups having the same configurations as described above according to the plug assist air-pressure forming method.

With respect to each of the so obtained 6 kinds of cups, the peel strength, the thickness unevenness in both the vertical and circumferential directions of the cup and the standard deviations δL and δH were determined to obtain results shown in Table 6.

As will be apparent from the results shown in Table 6, as compared with the normal heat forming method conducted at 265° C., in the solid phase pressure forming method conducted at 226° C., resin combinations satisfying the requirements of the present invention give generally better results.

In the above-mentioned DTA method, the melting-initiating temperature (the temperature at which melting endotherm takes place in the DTA thermogram) of 6-nylon (N1) was 209° C. and the melting-ending temperature (the temperature at which melting endotherm is completed in the DTA thermogram) was 229° C. The melting-initiating temperature of the blend (N13) of 6-nylon and 6,6-nylon was 203° C. and the melting-ending temperature of the nylon blend was 232° C. The melting-initiating and melting-ending temperatures of 6,6-nylon were 246° C. and 268° C., respectively. Accordingly, when the forming was carried out at 226° C., 6-nylon (N1) and nylon blend (N13) were in the semi-molten state and 6,6-nylon was maintained at the forming step at a temperature much lower than the melting-initiating temperature (246° C.).

Table 6

| Intermediate Layer-Constituting Material | Forming Temperature (°C.) | Peel Strength (g/1 cm width) | | Thickness Unevenness | |
|---|---|---|---|---|---|
| | | Intermediate layer-adhesive layer | Adhesive layer-innermost or outermost layer | δL | δH |
| N1 | 226 | 935 | 410 | 0.15 | 0.09 |
| N3 | 226 | 15 | 20 | 0.20 | 0.12 |
| N13 | 226 | 930 | 420 | 0.13 | 0.10 |
| N1 | 268 | 930 | 420 | 0.42 | 0.12 |
| N3 | 268 | 1030 | 380 | 0.50 | 0.11 |

Table 6-continued

| Intermediate Layer-Constituting Material | Forming Temperature (°C.) | Peel Strength (g/1 cm width) | | Thickness Unevenness | |
| --- | --- | --- | --- | --- | --- |
| | | Intermediate layer-adhesive layer | Adhesive layer-innermost or outermost layer | δL | δH |
| N13 | 268 | 920 | 480 | 0.43 | 0.15 |

EXAMPLE 5

Four kinds of sheets prepared in Example 2 were subjected to cold rolling at a rolling speed of about 5 m/min at room temperature by using a roll. The sheet thickness after the cold rolling was about 0.40 mm. The cold-rolled sheets were heated at a tray-forming temperature precisely controlled to a level indicated in Table 7 and then formed in rectangular trays having a length of 140 mm, a width of 100 mm and a depth of 25 mm under a forming pressure of 5 to 9 Kg/cm² according to the known plug assist air-pressure forming method.

For comparison, the foregoing 4 kinds of cold-rolled sheets were sufficiently heated at about 210° C. and formed in rectangular trays having the same dimensions as described above according to the plug assist air-pressure forming method.

With respect to each of the foregoing 4 kinds of sheets before cold rolling, the foregoing 4 kinds of cold-rolled sheets and the foregoing 8 kinds of formed trays, in the same manner as described in Example 1, the peel strength and orientation coefficients (l, m and n) were determined. With respect to each of the foregoing 8 kinds of trays, the haze (Hz) was determined according to the method of JIS K-6714. Results are shown in Table 7.

As will be apparent from the results shown in Table 7, even when rolled sheets are formed into trays, if the requirements of the present invention are satisfied, the properties of trays can be remarkably improved. It will also be understood that even if properties are improved by rolling, when normal heat forming is conducted on rolled sheets, the improved properties, for example, the peel strength between the intermediate and adhesive layers and the haze, are lowered to levels before rolling.

Table 7

| Sheet | Intermediate Layer | Tray-Forming Temperature (°C.) | Peel Strength* (g/1 cm width) | | Orientation Coefficients** (innermost and outermost layers) | | | Haze (Hz) (%) |
| --- | --- | --- | --- | --- | --- | --- | --- | --- |
| | | | intermediate layer-adhesive layer | adhesive layer-innermost or outermost layer | l | m | n | |
| Unrolled Sheet | EV1 | | 285 | not peeled | 0.02 | 0.01 | 0.97 | 21 |
| | EV2 | | 320 | " | 0.01 | 0.03 | 0.96 | 20 |
| | EV3 | | 430 | " | 0.02 | 0.01 | 0.97 | 21 |
| | EV4 | | 250 | " | 0.03 | 0.02 | 0.95 | 19 |
| Cold-Rolled Sheet | EV1 | | 420 | " | 0.20 | 0.08 | 0.72 | 12 |
| | EV2 | | 525 | " | 0.21 | 0.07 | 0.72 | 13 |
| | EV3 | | 930 | " | 0.21 | 0.06 | 0.73 | 11 |
| | EV4 | | 390 | " | 0.20 | 0.05 | 0.75 | 15 |
| | EV1 | 155 | 415 | " | 0.38 | 0.18 | 0.44 | 8 |
| | EV2 | 155 | 520 | " | 0.45 | 0.15 | 0.40 | 7 |
| | EV3 | 155 | <10*** | " | 0.35 | 0.18 | 0.47 | 7 |
| | EV4 | 155 | 395 | " | 0.37 | 0.17 | 0.46 | 13 |
| | EV1 | 210 | 283 | " | 0.03 | 0.02 | 0.95 | 18 |
| | EV2 | 210 | 310 | " | 0.03 | 0.02 | 0.95 | 19 |
| | EV3 | 210 | 450 | " | 0.02 | 0.01 | 0.95 | 21 |
| | EV4 | 210 | 310 | " | 0.03 | 0.01 | 0.96 | 20 |

Notes
*: average value (sample number = 10)
**: l direction designates the rolling direction of the starting sheet, which corresponds to the direction of the long axis of the rectangular shape of the tray.
***: delamination was caused between the intermediate and adhesive layers of the tray.

EXAMPLE 6

Symmetric 7-layer sheets composed of four resins were prepared from the same resin combination as that used in Example 1 for formation of innermost, outermost, intermediate and adhesive layers, and additionally, sheet scraps formed at the forming step in this Example and scraps formed by crushing defective cups formed in this Example by a crusher were used as the resin material for formation of layers interposed between the innermost layer and adhesive layer and between the outermost layer and adhesive layer. From these resin materials, symmetric 7-layer sheets having a thickness of about 0.8 mm and a width of 450 mm were molded by using the same extruder for formation of innermost and outermost layers, the same extruder for formation of adhesive layers, the same extruder for formation of intermediate layers and the same sheet-winding machine as used in Example 2, and additionally, an extruder for formation of intervening layers, which was installed with a full-flighted screw having a diameter of 40 mm and an effective length of 880 mm, and a sheet extrusion molding machine comprising a multi-channel adaptor and a T-die having a lip width of 0.8 mm and a lip length of 500 mm were used for the sheet-forming operation. The screw rotation numbers of the four extruders were adjusted so that in the molded sheets, the thickness ratio of innermost or outermost layer/intervening layer/adhesive layer/intermediate layer was as close to 100:20:5:10 as possible.

The so obtained 4 kinds of sheets were sufficiently heated at 155° C. and then formed into cylindrical cups having the same configurations and unit weight as those of the cups prepared in Example 2 according to the known plug assist air-pressure forming method. For comparison, these sheets were formed into cylindrical cups having the same configurations and unit weight as above according to the sheet blow molding method as in Example 2.

Cups prepared by plug assist air-pressure forming (solid phase forming) by using EV1 as the intermediate layer-constituting resin were designated as "SR1" and cups prepared by sheet blow molding of molten sheets containing EV1 as the intermediate layer-constituting resin were designated as "SBB1". Similarly, cups formed by plug assist air-pressure forming by using EV2, EV3 and EV4 and cups formed by sheet blow molding by using EV2, and EV3 and EV4 were designated as "SPR2", "SPR3", "SPR4", "SBB2", "SBB3" and "SBB4", respectively.

With respect to each of these 8 kinds of cups, the oxygen transmission rate ($QO_2$), haze (Hz), orientation coefficients (l, m and n), vibration resistance (N, ADN) and thickness unevenness ($\delta L$ and $\delta H$) in the intermediate layer were determined in the same manner as described in Example 2 to obtain results shown in Table 8.

From the results shown in Table 8, it will readily be understood that the transparency of cups obtained in this Example is inferior to that of the cups obtained in Example 2 because of the presence of intervening layers of scraps, but a similar tendency is observed in this Example with respect to other items and cups having excellent properties can be obtained if the requirements of this invention are satisfied.

0.91 g/cc as measured according to the method of ASTM D-1505 (data of density given hereinafter are those determined by the same method) and a melting point of 165° C. as measured according to the DTA method was used as the resin constituting the outer and inner layers. A modified low density polyethylene (manufactured and sold under tradename "MODIC" by Mitsubishi Petrochemical) having a melt index of 2.0 g/10 min, a density of 0.92 g/cc, a melting point of 113° C. as measured according to the DTA method and a carbonyl group concentration of 180 millimoles per 100 g of the polymer was used as the adhesive layer-constituting resin. An ethylene-vinyl alcohol copolymer having an ethylene content of 35 mole %, a vinyl alcohol content of 64.5 mole %, a residual vinyl acetate content of 0.5 mole %, a melting point of 164° C. as measured according to the DTA method (temperature-elevating rate = 10° C./min) and an oxygen permeability of $0.16 \times 10^{-12}$ cc·cm/cm$^2$·sec·cmHg as measured at a temperature of 37° C. and a relative humidity of 0% was used as the oxygen-barrier intermediate layer. Parisons of this multi-layer structure were designated as "parisons A".

Bottomless laminate pipes (laminate parisons) having the same symmetric 5-layer structure as described above were prepared by using the same co-extrusion equipment system as described above. The same resins as described above were used for formation of outer, inner and intermediate layers, but as the adhesive layer-constituting resin, there was employed a modified polypropylene (manufactured and sold under tradename "MODIC" by Mitsubishi Petrochemical) having a melt index of 2.0 g/10 min, a density of 0.91 g/cc, a melting point of 160° C. as measured according to the DAT method and a carbonyl group concentration of 167 millimoles per 100 g of the polymer. The pipes (pari- Table 8

| Symbol of Cup | $QO_2$, cc/m$^2$·day·atm | Hz (%) (cup) | Orientation Coefficients (innermost and outermost layers) | | | Vibration Test Results | | Thickness Unevenness in Intermediate Layer | |
|---|---|---|---|---|---|---|---|---|---|
| | | | $\gamma$ | m | n | N | ADN | $\delta L$ | $\delta H$ |
| SPR1 | 1.7 | 12 | 0.32 | 0.10 | 0.58 | 0 | 0 | 0.19 | 0.09 |
| SPR2 | 0.6 | 9 | 0.39 | 0.10 | 0.51 | 0 | 0 | 0.14 | 0.09 |
| SPR3 | 0.6 | 9 | 0.31 | 0.14 | 0.55 | 0 | 2 | 0.20 | 0.11 |
| SPR4 | 20.2 | 18 | 0.32 | 0.15 | 0.53 | 0 | 1 | 0.53 | 0.29 |
| SBR1 | 3.8 | 26 | 0.03 | 0.01 | 0.96 | 0 | 1 | 0.21 | 0.13 |
| SBR2 | 3.2 | 24 | 0.04 | 0.01 | 0.95 | 1 | 2 | 0.19 | 0.14 |
| SBR3 | 2.8 | 25 | 0.02 | 0.02 | 0.96 | 1 | 1 | 0.20 | 0.13 |
| SBR4 | 31.0 | 27 | 0.04 | 0.01 | 0.95 | 1 | 2 | 0.21 | 0.12 |

EXAMPLE 7

Bottom-less laminate pipes (laminate parisons) having a symmetric 5-layer structure of outer layer/adhesive layer/oxygen-barrier layer (intermediate layer)/adhesive layer/inner layer were prepared by using an extruder for formation of intermediate layers having a diameter of 40 mm, an effective length of 880 mm and one melt channel passage, an extruder for formation of adhesive layers having a diameter of 40 mm, an effective length of 880 mm and 2 melt channel passages, an extruder for formation of outer and inner layers having a diameter of 65 mm, an effective length of 1430 mm and 2 melt channel passages and a 5-ply die for co-extrusion.

An isotactic homopolypropylene having a melt index of 0.5 g/10 min as measured according to the method of ASTM D-1238 (data of melt index given hereinafter are those as determined by the same method), a density of sons) were designated as "pipes B".

In each of the pipes A and B, the total thickness was about 10 mm, the inner diameter was 30 mm and the length was 30 mm, and the thickness ratio of outer layer/adhesive layer/intermediate layer/adhesive layer/inner layer was 1:1/20:1/50:1/20:1.

The pipes (parisons) A and B were heated for 35 minutes in an atmosphere maintained at 158±0.5° C. Both the ends of each pipe were climped by clamps, and the pipe was drawn in the longitudinal direction. Then, the pipe was gripped by a mold for blow molding and air was introduced under pressure from one end to inflate the parison in the lateral direction. Thus, biaxially drawn blow bottles having a symmetric 5-layer structure were prepared. In the so obtained bottles, the inner diameter was 100 mm, the height is 150 mm, the average thickness of the bottle wall was 0.6 mm, the inner capacity was about 1180 cc and the unit volume was 0.31 dl/g. The bottles had a cylindrical shape, and it was confirmed that in each bottle, the multi-layer structure was the same as the above-mentioned structure of the parison. Bottles prepared from parisons A and from parisons B were designated as "bottles AB" and "bottles BB", respectively.

With respect to each of the so obtained bottles, the oxygen permeability ($QO_2$) was determined according to the method described in Japanese Pat. Publication No. 11263/77, and the haze (Hz) was determined according to the method of JIS K-6714. Further, the bottles were subjected to the falling test described below to determine the impact resistance (SB) and delamination resistance (LB). The falling test was conducted in the following manner.

Twenty bottles were optionally chosen from each of groups AB and BB of bottles, and 1150 cc of an fqueous solution of table salt was filled in each sample bottle. The filled bottles were allowed to stand over 3 days and nights in an atmosphere maintained at $-1°$ C. and they were let to fall on a concrete floor from a height of 100 cm in an atmosphere maintained at 20° C. so that bottoms of the bottles hit on the concrete floor, and the falling strength (impact resistance represented by $S_B=100\times[20-S_1]/20$ in which $S_1$ represents a number of bottles broken at the first falling test) was determined. Further, with respect to N of bottles which were not broken in the above falling test, occurrence of delamination in the bottom portion, barrel portion, shoulder portion and mouth portion was visually checked by a panel of 5 men, and the delamination resistance ($L_B=100\times[N-L_1]/N$ in which $L_1$ represents a number of bottles in which it was judged that delamination took place, among N of bottles which were not broken at the first falling test) was determined. Obtained results are shown in Table 9.

As will be apparent from the results shown in Table 9, there is no substantial difference between bottles AB and BB with respect to the oxygen permeability ($QO_2$) and haze (Hz), but bottles AB are apparently excellent over bottles BB with respect to the measured values of impact strength ($S_B$) and delamination resistance ($L_B$). Thus, it is seen that blow bottles AB formed by heating formed pipes to melt the adhesive layer-constituting resin and then biaxially drawing the pipes are much excellent over blow bottles BB formed by conducting biaxial drawing without melting the adhesive resin layer-constituting resin with respect to the impact resistance and delamination resistance.

When pipes B were heated for 20 minutes in an atmosphere maintained at $198°\pm1°$ C., the pipes were molten and they could not retain their shapes. Accordingly, in this case biaxial drawing was impossible.

EXAMPLE 9

|  | Bottle AB | Bottle BB |
| --- | --- | --- |
| Oxygen Permeability ($QO_2$, cc/m$^2$ . day . atm) | 10.0 | 10.4 |
| Haze (Hz, %) | 8.4 | 8.5 |
| Impact Resistance ($S_B$, %) | 90 | 60 |
| Delamination Resistance ($L_B$, %) | 72.2 | 0 |

EXAMPLE 8

Sheets having a symmetric 5-layer structure of outermost layer/adhesive layer-oxygen-barrier layer (intermediate layer)/adhesive layer/innermost layer were prepared by using an extruder for formation of outermost and innermost layers, which was installed with a full-flighted screw having a diameter of 65 mm and an effective length of 1430 mm and had 2 divided flow passages (melt channels), an extruder for formation of adhesive layers, which was installed with a full-flighted screw having a diameter of 40 mm and an effective length of 880 mm and had 2 divided melt channels, an extruder for formation of intermediate layers, which was installed with a full-flighted screw having a diameter of 40 mm and an effective length of 880 mm, a 5-ply T-die having a lip width of 0.6 mm and a lip length of 500 mm and a sheet-forming machine.

The same ethylene-vinyl alcohol copolymers EV1 and EV2 as used in Example 1 and an ethylene-vinyl alcohol copolymer (EV-5) having an ethylene content of 63 mole %, a vinyl alcohol content of 37 mole %, a melting point of 128° C. as the DTA method described in Example 1 and an oxygen permeability of $4.4\times10^{-12}$ cc·cm/cm$^2$·sec·cmHg as measured under the conditions described in Example 1 were used as the intermediate layer-constituting resin. Low-pressure polyethylene (HDPF) having a density of 0.955 g/cc, a melting point of 131° C. as measured according to the DTA method and a melt index of 0.3 g/10 min as measured according to the method of JIS K-6760 and medium low-pressure polyethylene (MDPE) having a density of 0.935 g/cc, a melting point of 122° C. as measured according to the DTA method and a melt index of 1.0 g/10 min as measured according to the above method were used as the resin constituting the innermost and outermost layers. A modified low density polyethylene (manufactured and sold under tradename "MODIC" by Mitsubishi Petrochemical) having a density of 0.92 g/cc, a melting point of 114° C. as measured according to the DTA method, a melt index of 0.3 g/10 min as measured according to the above method and a carbonyl group concentration of 48 millimoles per 100 g of the polymer was used as the adhesive layer-constituting resin.

In the so formed sheets, the thickness was about 0.8 mm and the width was about 450 mm. At the sheet-forming step, the rotation rates of the screws of the three extruders were adjusted so that the thickness ratio of innermost or outermost layer/adhesive layer/intermediate layer was as close to 100:5:10 as possible.

The so prepared 6 kinds of sheets were cold-rolled at room temperature at a rolling speed of about 5 m/min by using a pair of rolls having a diameter of 10 mm and a width of 500 mm. The cold-rolled sheets had a thickness of about 0.35 mm. Then, the rolled sheets were sufficiently heated in a hot air-circulated oven maintained precisely at a forming temperature indicated in Table 10. Then, the sheets were formed under a pressure of 5 to 9 Kg/cm$^2$ into rectangular trays having a length of 140 mm, a width of 100 mm and a depth of 25 mm according to the known plug assist air-pressure forming method.

For comparison, the foregoing 6 kinds of cold-rolled sheets were heated sufficiently at 190° or 200° C. and then, they were formed into rectangular trays having the same configurations as described above according to the plug assist air-pressure forming method.

With respect of each of 6 kinds of sheets before cold rolling, 6 kinds of cold-rolled sheets and 12 kinds of so prepared trays, specimens having a width of 10 mm and a length of 50 mm were cut off, the interlaminar peel strength (intermediate layer-adhesive layer and adhesive layer-innermost or outermost layer) was measured at a peeling speed of 100 mm/min in an atmosphere quirements of the present invention are collectively excellent.

Table 10

| Sheet | Layer-Constituting Resins Intermediate Layer | Layer-Constituting Resins Innermost and Outermost Layers | Tray-Forming Temperature (°C.) | Peel Strength*[g/cm width] Intermediate layer-adhesive layer | Peel Strength*[g/cm width] Adhesive layer-innermost or outermost layer |
|---|---|---|---|---|---|
| Unrolled Sheet | EV1 | HDPE | | 198 | not peeled |
| | " | MDPE | | 220 | " |
| | EV2 | HDPE | | 119 | " |
| | " | MDPE | | 184 | " |
| | EV5 | HDPE | | 189 | " |
| | " | MDPE | | 168 | " |
| Cold-Rolled Sheet | EV1 | HDPE | | 1020 | " |
| | " | MDPE | | 1130 | " |
| | EV2 | HDPE | | 1060 | " |
| | " | MDPE | | 1100 | " |
| | EV5 | HDPE | | 1090 | " |
| | " | HDPE | | 980 | " |
| Cold-Rolled Sheet | EV1 | HDPE | 129 | 1005 | " |
| | " | MDPE | 118 | 150 | " |
| | EV2 | HDPE | 129 | 655 | " |
| | " | MDPE | 118 | 135 | " |
| | EV5 | HDPE | 129 | 1030 | " |
| | " | MDPE | 118 | 950 | " |
| | EV1 | HDPE | 198 | 160 | " |
| | " | MDPE | 198 | 173 | " |
| | EV2 | HDPE | 200 | 110 | " |
| | " | MDPE | 200 | 170 | " |
| | EV5 | HDPE | 195 | 185 | " |
| | " | MDPE | 195 | 158 | " |

| Sheet | Layer-Constituting Resins Intermediate layer | Layer-Constituting Resins Innermost and Outermost layers | Orientation Coefficients** (innermost and outermost layers) l | Orientation Coefficients** (innermost and outermost layers) m | Orientation Coefficients** (innermost and outermost layers) n | Haze (Hz) (%) |
|---|---|---|---|---|---|---|
| Unrolled Sheet | EV1 | HDPE | 0.02 | 0.01 | 0.97 | — |
| | " | MDPE | 0.01 | 0.01 | 0.98 | — |
| | EV2 | HDPE | 0.02 | 0.01 | 0.97 | — |
| | " | MDPE | 0.01 | 0.02 | 0.97 | — |
| | EV5 | HDPE | 0.01 | 0.01 | 0.98 | — |
| | " | MDPE | 0.03 | 0.01 | 0.96 | — |
| Cold-Rolled Sheet | EV1 | HDPE | 0.19 | 0.08 | 0.73 | — |
| | " | MDPE | 0.17 | 0.09 | 0.74 | — |
| | EV2 | HDPE | 0.21 | 0.06 | 0.73 | — |
| | " | MDPE | 0.22 | 0.09 | 0.69 | — |
| | EV5 | HDPE | 0.18 | 0.10 | 0.72 | — |
| | " | MDPE | 0.19 | 0.07 | 0.74 | — |
| Cold-Rolled Sheet | EV1 | HDPE | 0.19 | 0.11 | 0.70 | 42 |
| | " | MDPE | 0.18 | 0.10 | 0.72 | 30 |
| | EV2 | HDPE | 0.22 | 0.11 | 0.67 | — |
| | " | MDPE | 0.23 | 0.09 | 0.68 | — |
| | EV5 | HDPE | 0.19 | 0.10 | 0.71 | — |
| | " | MDPE | 0.20 | 0.08 | 0.72 | — |
| | EV1 | HDPE | 0.03 | 0.02 | 0.95 | 78 |
| | " | MDPE | 0.02 | 0.04 | 0.94 | 62 |
| | EV2 | HDPE | 0.04 | 0.03 | 0.93 | 82 |
| | " | MDPE | 0.01 | 0.04 | 0.95 | 51 |
| | EV5 | HDPE | 0.03 | 0.02 | 0.95 | 79 |
| | " | MDPE | 0.04 | 0.03 | 0.93 | 53 |

Notes
*: average value (sample number = 10)
**: l direction of the tray corresponds to the rolling direction of the starting sheet and to the direction of the long axis of the rectangular shape of the tray.

maintained at a temperature of 20° C. and a relative humidity of 60%, and the orientation coefficients (l, m and n) of the intermediate layer were determined according to the fluorescent method described hereinbefore. Further, with respect to 12 kinds of the resulting trays, the haze (Hz) was determined according to the method of JIS K-6714. Test results are shown in Table 10.

As will be apparent from the results shown in Table 10, trays prepared from resin combinations HDPE-EV1, HDPE-EV2 and MDPE-EV5 meeting the re-

EXAMPLE 9

Symmetric 5-layer sheets having a thickness of 0.8 mm and a width of 450 mm were formed by using the extruding and sheet-forming equipment system described in Example 8. The rotation numbers of the screws were adjusted as in Example 8 so that the thickness ratio of innermost or outermost layer/adhesive layer/intermediate layer was as close to 100:5:10 as possible.

The same ethylene-vinyl alcohol copolymers EV1 and EV2 as used in Example 1 were used as the intermediate layer-constituting resin. Polybutene-1 having a density of 0.915 g/cc, a melting point of 129° C. as measured according to the DTA method and a melt flow index of 0.1 g/10 min as measured according to the method of ASTM D1238 (condition E) was used as the resin constituting the innermost and outermost layers.

A modified ethylene-vinyl acetate copolymer (manufactured and sold under tradename "MODIC" by Mitsubishi Petrochemical) having a density of 0.94 g/cc, a melting point of 93° C. as measured according to the DTA method, a melt index of 2.0 g/10 min as measured according to the method of JIS K-6760 and a carbonyl group concentration of 240 millimoles per 100 g of the polymer was used as the resin constituting the adhesive layer between the intermediate layer and the innermost or outermost layer.

Two kinds of the so prepared sheets were sufficiently heated in a hot air-circulated oven maintained precisely at a forming temperature indicated in Table 11 and installed wih an infrared heater, and then, they were formed into cylindrical cups having a diameter of 85 mm, a height of 50 mm, an inner capacity of 300 cc and a unit weight of 9 to 10 g per cup according to the known plug assist air-pressure forming method.

For comparison, the foregoing 2 kinds of sheets were sufficiently heated at 190° to 200° C. in the above-mentioned oven and they were formed into cylindrical cups having the same dimensions as described above according to plug assist air-pressure forming method.

With respect to each of the so prepared 4 kinds of cups, the oxygen permeability ($QO_2$) was determined according to the method described in Example 7. Ten cups were chosen from each of the foregoing 4 kinds of cups, and 340 g of an aqueous solution of table salt was filled in each cup and an aluminum lid was attached to each cup by means of a seamer. Then, the cups were allowed to stand in an atmosphere maintained at $-1°$ C. over three days and nights, and immediately, they were let to fall on a concrete floor from a height of 3 mm in an atmosphere maintained at 20° C. so that the bottoms hit on the concrete floor. The falling strength ($S_B$) was calculated according to the method described in Example 7, and the delamination resistance ($L_B$ defined in Example 7) was visually evaluated by a panel of 5 men. Obtained results are shown in Table 11.

As will be apparent from the results shown in Table 11, cups excellent in oxygen-barrier property and falling strength can be obtained when resin combinations including EV1 as the intermediate layer constituting resin and meeting the requirements of the present invention are used and the forming temperature is adjusted to 125° C.

Table 11

| Intermediate Layer-Constituting Resin | Forming Temperature (°C.) | Oxygen Permeability($QO_2$) (cc/m² . day . atm) | Falling Strength ($S_B$) [%] | Delamination Resistance ($L_B$) [%] |
|---|---|---|---|---|
| EV1 | 125 | 1.2 | 100 | 100 |
| EV2 | 125 | 0.4 | 90 | 90.0 |
| EV1 | 200 | 2.1 | 80 | 87.5 |
| EV2 | 200 | 0.8 | 70 | 71.4 |

EXAMPLE 10

Symmetric 5-layer sheets having a thickness of about 0.8 mm and a width of 450 mm were formed by using the extruding and sheet-forming equipment system described in Example 8. The rotation numbers of the screws of the extruders were adjusted so that the thickness ratio of innermost or outermost layer/adhesive layer/intermediate layer was as close to 100:5:10 as possible.

The same ethylene-vinyl alcohol copolymers EV1, EV2 and EV5 as used in Example 8 were employed as the intermediate layer-constituting resin. A polycarbonate (PC) synthesized from phosgene and bisphenol-A, which had a softening point of 160° C. as measured according to the torsion rigidity measurement method, and poly(methyl methacrylate) (PMMA) having a glass transition temperature of 115° C. as measured according to the DTA method were used as the resin constituting the innermost and outermost layers. The same modified ethylene-vinyl acetate copolymer as used in Example 8 was used as the resin constituting the adhesive layer between the intermediate layer and the innermost or outermost layer.

The so prepared 6 kinds of sheets were formed into cylindrical cups having the same configurations and unit weight as those of the cups prepared in Example 9 at a forming temperature indicated in Table 12 according to the known plug assist air-pressure forming method.

With respect to each of the so formed 6 kinds of cups, the orientation coefficients (l, m and n) of the intermediate layer were determined according to the above-mentioned fluorescence method, the interlaminar peel strength between the intermediate layer and adhesive layer was measured according to the method described in Example 8, and the thickness unevenness (standard deviations $\delta L$ and $\delta H$) in the vertical direction and circumferential direction of the cup was determined. Obtained results are shown in Table 12.

From the results shown in Table 12, it will readily be understood that when resin combinations meeting the requirements of the present invention are employed, cups collectively excellent in various properties can be obtained.

Table 12

| Layer-Constituting Resins | | Forming Temperature (°C.) | Orientation Coefficients | | | Thickness Uniformity in Cup | | Peel Strength(g/cm width) (intermediate layer-adhesive layer) |
|---|---|---|---|---|---|---|---|---|
| Intermediate Layer | Innermost or outermost layer | | l | m | n | $\delta L$ | $\delta H$ | |
| EV1 | PC | 153 | 9.32 | 0.10 | 0.58 | 0.18 | 0.07 | 480 |
| EV3 | PC | 153 | 0.29 | 0.12 | 0.59 | 0.20 | 0.10 | <10 |
| EV5 | PC | 153 | 0.30 | 0.09 | 0.61 | 0.19 | 0.15 | 235 |
| EV1 | PMMA | 105 | 0.25 | 0.09 | 0.66 | 0.23 | 0.08 | 253 |

Table 12-continued

| Layer-Constituting Resins | | Forming Temperature (°C.) | Orientation Coefficients | | | Thickness Uniformity in Cup | | Peel Strength(g/cm) width) (intermediate layer-adhesive layer) |
|---|---|---|---|---|---|---|---|---|
| Intermediate Layer | Innermost or outermost layer | | l | m | n | δL | δH | |
| EV3 | PMMA | 105 | 0.27 | 0.06 | 0.67 | 0.25 | 0.12 | <10 |
| EV5 | PMMA | 105 | 0.23 | 0.07 | 0.70 | 0.21 | 0.14 | 135 |

What we claim is:

1. A transparent multi-layer varied thickness container obtained by draw-forming a parison composed of a coextrudate of at least one oxygen barrier thermoplastic resin layer and at least one crystalline polyolefin layer, said oxygen barrier thermoplastic resin having an oxygen permeability lower than $5.5 \times 10^{-12}$ cc·cm/c-m²·sec·cmHg as measured at 37° C. and being selected from the group consisting of a copolymer consisting essentially of ethylene and vinyl alcohol and a polyamide, wherein said oxygen barrier thermoplastic resin and said polyolefin are selected so that the requirement represented by the following formula:

$$|T_B - T_O| \leq 35° C.$$

wherein $T_B$ stands for the melting or softening point (°C.) of said oxygen-barrier thermoplastic resin and $T_O$ stands for the melting or softening point (°C.) of said polyolefin, is satisfied, and wherein at least one of two-dimensional orientation coefficients (l and m) of at least one layer composed of said polyolefin in a smallest-thickness portion of the container is at least 0.05.

2. A container as set forth in claim 1 wherein the oxygen barrier thermoplastic resin is an ethylenevinyl alcohol copolymer containing vinyl alcohol units at a content satisfying the requirement represented by the following formula:

$$0.61 T_O - 56.8 \leq X \leq 0.61 T_O - 26.2$$

wherein $T_O$ stands for the melting or softening point (°C.) of the polyolefin and X stands for the content (mole %) of the vinyl alcohol units in the oxygen barrier thermoplastic resin.

3. A container as set forth in claim 1 wherein the oxygen barrier thermoplastic resin and the polyolefin are selected so that the requirement represented by the following formula:

$$|T_B - T_O| \leq 10° C.$$

wherein $T_B$ and $T_O$ are as defined above, is satisfied, at least one of two-dimensional orientation coefficients (l and m) of at least one layer of the polyolefin in a smallest-thickness portion of the container is at least 0.1, each resin layer has a haze (Hz) lower than 10%, and wherein the bonding strength between every two adjacent layers is at least 20 g/cm.

4. A container as set forth in claim 1 wherein the poloylefin is a crystalline polypropylene or a crystalline ethylene-propylene copolymer having an ethylene content of 1 to 20 mole %.

5. A container as set forth in claim 1 wherein the polyolefin is present on both the surfaces of the container as the outermost and innermost layers and the oxygen barrier thermoplastic resin is present as the intermediate layer of the container.

6. A transparent multi-layer varied thickness container obtained by draw-forming a parison composed of a co-extrudate of at least one layer composed of (A) an oxygen barrier thermoplastic resin having an oxygen permeability lower than $5.5 \times 10^{-12}$ cc·cm/c-m²·sec·cmHg as measured at 37° C., at least one layer comprising (B) a crystalline polyolefin and at least one layer interposed between said oxygen barrier thermoplastic resin layer and said polyolefin layer and being composed of (C) a resin having an adhesiveness to both of said resins, said oxygen barrier thermoplastic resin being selected from the group consisting of a copolymer consisting essentially of ethylene and vinyl alcohol and a polyamide, said adhesive resin being a polyolefin modified with at least one ethylenically unsaturated monomer selected from the group consisting of unsaturated carboxylic acids and anhydrides, esters and amides thereof containing carbonyl groups at a concentration of 10 to 1400 millimols per 100 g of the polymer, wherein said three resins are selected to that the requirements represented by the following formulae:

$$|T_B - T_O| \leq 35° C.$$

and $$90° C. \geq T_O - T_C \geq 2° C.$$

wherein $T_B$ stands for the melting or softening point (°C.) of said oxygen-barrier thermoplastic resin, $T_O$ stands for the melting or softening point (°C.) of said polyolefin and $T_C$ stands for the melting or softening point (°C.) of said adhesive resin, at least one of two-dimensional orientation coefficients (l and m) of at least one layer composed of said polyolefin in a smallest-thickness portion of the container is at least 0.05, and wherein the layer of said adhesive resin is substantially non-oriented.

7. A container as set forth in claim 6 wherein the polyolefin (B) is a crystalline polypropylene or a crystalline ethylene-propylene copolymer having an ethylene content of 1 to 20 mole %, the layer comprising said polyolefin is present on both the surfaces of the container as the outermost and innermost layers, the oxygen barrier thermoplastic resin (A) is a copolymer consisting essentially of ethylene and vinyl alcohol and containing vinyl alcohol units at a content satisfying the requirement represented by the following formula:

$$0.61 T_O - 56.8 \leq X \leq 0.61 T_O - 26.2$$

wherein $T_O$ stands for the melting or softening point (°C.) of the polyolefin (B) and X stands for the content (mole %) of the vinyl alcohol units in the oxygen barrier thermoplastic resin (A), the layer of said oxygen barrier thermoplastic resin is present as the intermediate layer of the container, the adhesive resin (C) is present as the adhesive layer interposed between the outer surface layer and the intermediate layer and as the adhesive layer interposed between he inner surface layer and the intermediate layer, and wherein the thickness ration of the respective resin layers is in the following range:

(B):(A)=from 1:1 to 500:1 and
(B):(C)=from 1:1 to 500:1.

8. A container as set forth in claim 6 which is a biaxially drawn plastic bottle.

9. A container as set forth in claim 6 which is a draw-formed plastic cup.

* * * * *